United States Patent [19]
Koike

[11] Patent Number: 5,711,582
[45] Date of Patent: Jan. 27, 1998

[54] PRESSURE CONTROL DEVICE WHEREIN SHUT-OFF VALVES ARE OPENED AND CLOSED IN TIMED RELATION WITH SUCTION AND DELIVERY STROKES OF RECIPROCATING PUMP DEVICE

[75] Inventor: Shin Koike, Toyota, Japan

[73] Assignee: Toyota Jidosha Kabushiki Kaisha, Toyota, Japan

[21] Appl. No.: 648,723

[22] Filed: May 16, 1996

[30] Foreign Application Priority Data

May 19, 1995 [JP] Japan ................... 7-121456

[51] Int. Cl.⁶ ............................................. B60T 8/48
[52] U.S. Cl. ................. 303/11; 303/116.1; 303/116.4
[58] Field of Search ................. 303/10, 11, 157, 303/158, 162, 115.4, 115.5, 116.1, 116.2, 116.4, DIG. 1–4

[56] References Cited

U.S. PATENT DOCUMENTS 5,156,449  10/1992  Wetzel .................................. 303/113.2
5,324,103   6/1994  Iwata .................................... 303/113.2

FOREIGN PATENT DOCUMENTS 1190571A  7/1989  Japan.
4169370A  6/1992  Japan.

*Primary Examiner*—Josie Ballato
*Attorney, Agent, or Firm*—Kenyon & Kenyon

[57] ABSTRACT

A braking pressure control device having a first shut-off valve in a fluid passage connecting master cylinder and vehicle wheel brake cylinder, a second shut-off valve between the first shut-off valve and the brake cylinder, a reciprocatingly pump device having a variable-volume chamber which is connected to a portion of the fluid passage between the first and second shut-off valves and whose volume is changed by reciprocating movement of a pump piston, and a synchronizer for opening and closing the first and second shut-off valves in timed relationship with suction and delivery strokes of the pump piston for suction and delivery of a brake fluid into the variable-volume chamber.

15 Claims, 18 Drawing Sheets

PRESSURE DECREASE IN ANTI-LOCK CONTROL MODE

PRESSURE HOLD IN ANTI-LOCK CONTROL MODE

PRESSURE INCREASE IN ANTI-LOCK CONTROL MODE

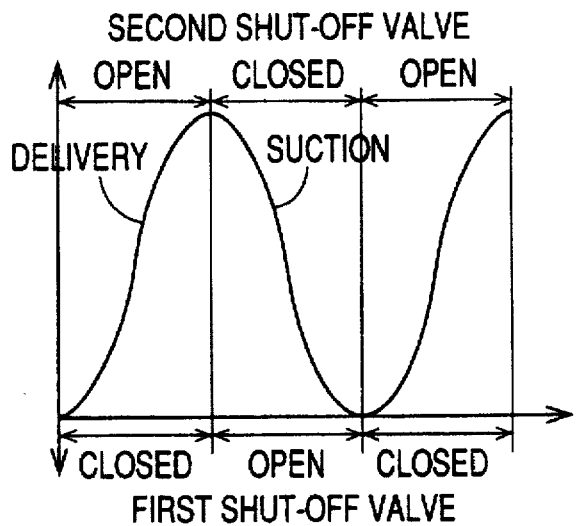
FIG.6A PRESSURE INCREASE IN TRACTION CONTROL MODE
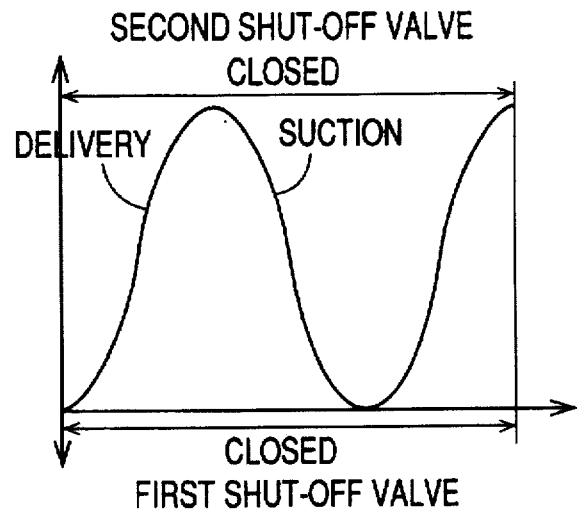
FIG.6B PRESSURE HOLD IN TRACTION CONTROL MODE
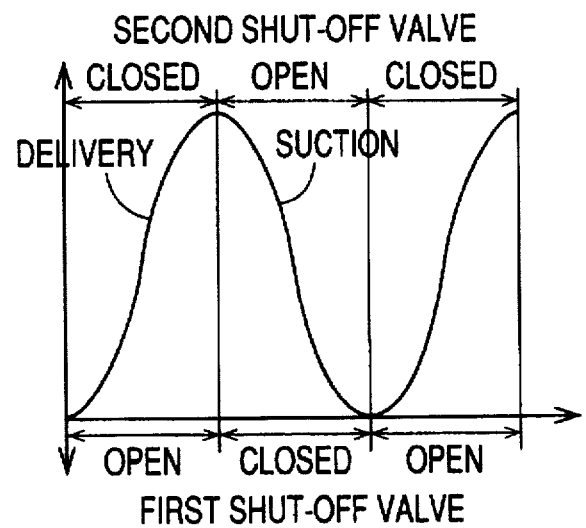
FIG.6C PRESSURE DECREASE IN TRACTION CONTROL MODE

FIG. 7

| LEFT WHEEL | DECREASE | DECREASE | HOLD | INCREASE | INCREASE | HOLD | HOLD |
|---|---|---|---|---|---|---|---|
| RIGHT WHEEL | DECREASE | HOLD | DECREASE | INCREASE | HOLD | INCREASE | HOLD |

PRESSURE CONTROL DEVICE WHEREIN SHUT-OFF VALVES ARE OPENED AND CLOSED IN TIMED RELATION WITH SUCTION AND DELIVERY STROKES OF RECIPROCATING PUMP DEVICE

BACKGROUND OF THE INVENTION

1. Field of the Invention

The present invention relates in general to a device for a hydraulic braking pressure, and more particularly to improvements in a hydraulic braking pressure control device which is electrically controllable to regulate the hydraulic braking pressure.

2. Discussion of the Related Art

The hydraulic braking pressure control device of the type indicated above is provided in a hydraulically operated braking apparatus for a motor vehicle and is used to regulate the hydraulic braking pressure in an anti-lock control mode or a traction control mode, as disclosed in JP-A-1-190571, for example.

The hydraulic braking pressure control device as disclosed in the above-identified publication employs three solenoid-operated shut-off vales for regulating the pressure (hereinafter referred to as "wheel brake cylinder pressure") in brake cylinders (hereinafter referred to as "wheel brake cylinders") for braking drive wheels of a motor vehicle, and is operable in an anti-lock control mode and a traction control mode. The three shut-off valves consist of a cut-off valve, a pressure increasing valve and a pressure reducing valve. The cut-off valve and the pressure increasing valves are provided in series in a fluid passage which connects a master cylinder and the wheel brake cylinder. The pressure reducing valve is provided in a reservoir passage which is connected at one end thereof to a portion of the above-indicated fluid passage between the pressure increasing valve and the wheel brake cylinder, and at the other end to a reservoir. The cut-off valve and the pressure increasing valve are normally-open solenoid-operated shut-off valves, while the pressure reducing valve is a normally-closed solenoid-operated shut-off valve.

In the anti-lock control mode, the cut-off valve is held in an open state thereof, and the pressure increasing and reducing valves are suitably opened and closed for increasing the wheel brake cylinder pressure by permitting a pressurized brake fluid to be from the master cylinder to the wheel brake cylinder under control, and reducing the wheel brake cylinder pressure by permitting the brake fluid to be discharged from the wheel brake cylinder to the reservoir, or for holding the wheel brake cylinder pressure by inhibiting supply and discharge flows of the the brake fluid into and from the wheel brake cylinder. The brake fluid discharged into the reservoir is pumped up by a pump device and returned to a portion of the above-indicated fluid passage (connecting the master cylinder and the wheel brake cylinder) which portion is between the cut-off and pressure increasing valves.

In the traction control mode, the cut-off valve is held in a closed state thereof, and the brake fluid is pumped up from the master cylinder through a by-pass passage which by-passes the cut-off valve, and is supplied to the wheel brake cylinder for a drive wheel under control, to brake the drive wheel without activation of the master cylinder by the vehicle operator. In the traction control mode, the wheel brake cylinder pressure is suitably increased, reduced or held by opening and closing the pressure increasing and reducing valves as needed as in the anti-lock control mode.

In the conventional hydraulic braking pressure control device, however, the rate of increase or decrease in the wheel braking pressure in the anti-lock and traction control modes is determined by the actual wheel brake cylinder pressure in the wheel brake cylinder under control and the actual pressure in the master cylinder. In other words, the rate of increase or decrease in the wheel brake cylinder pressure cannot be controlled as desired or needed.

Where the wheel brake cylinder pressure is reduced, for example, the rate of decrease in the wheel brake cylinder pressure is relatively high with a relatively high rate of discharge flow of the brake fluid from the wheel brake cylinder into the reservoir, when the wheel brake cylinder pressure upon initiation of the pressure decrease is relatively high. Conversely, the pressure decrease rate is relatively low with a relatively low rate of discharge flow of the brake fluid from the wheel brake cylinder, when the wheel brake cylinder pressure is relatively low. Where the wheel brake cylinder pressure is increased in the anti-lock control mode, the rate of increase in the wheel brake cylinder pressure is relatively high with a relatively high rate of supply flow of the brake fluid from the master cylinder into the wheel brake cylinder, when a difference between the master cylinder pressure and the wheel brake cylinder pressure is relatively large. Conversely, the pressure increase rate is relatively low with a relatively low rate of supply flow of the fluid into the wheel brake cylinder, when the pressure difference is relatively small.

In the hydraulic braking pressure control device in which the rates of increase and decrease in the wheel brake cylinder pressure are determined by the wheel brake cylinder pressure and the master cylinder pressure as described above, the accuracy of control of the wheel brake cylinder pressure is inevitably and undesirably low. Where the hydraulic braking pressure control device is operated in the anti-lock control mode during running of the motor vehicle on a road surface having a relatively low friction of coefficient, the wheel brake cylinder pressure is relatively low, and therefore the wheel brake cylinder pressure cannot be rapidly reduced even where it is required to reduce the wheel brake cylinder pressure at a comparatively high rate.

SUMMARY OF THE INVENTION

It is accordingly an object of this invention to provide a hydraulic braking pressure control device which is capable of controlling the rates of increase and decrease in the wheel brake cylinder pressure.

According to the principle of the present invention, there is provided a hydraulic braking pressure control device a hydraulic braking pressure control device wherein a master cylinder and a wheel brake cylinder for braking a vehicle wheel are connected by a fluid passage, the device being comprising:

a first shut-off valve provided in the fluid passage;

a second shut-off valve provided in a portion of the fluid passage between the first shut-off valve and the wheel brake cylinder;

a reciprocating pump device including a housing, a pump piston which is reciprocatingly movable in the housing and which cooperates with the housing to define a variable-volume chamber connected to a portion of the fluid passage between the first and second shut-off valves, and a pump piston drive device for reciprocating the pump piston, the pump drive device including an electric motor as a drive source; and synchronizing means for opening and closing the first and second shut-off valves in timed relationship with suction and delivery strokes of the pump piston for suction and delivery of a brake fluid into and from the variable-volume chamber.

In the hydraulic braking pressure control device of the present invention constructed as described above, the pressure of the brake fluid in the wheel brake cylinder is regulated by suitable combinations of the suction and delivery of the brake fluid into and from the variable-volume chamber of the reciprocating pump device and the opening and closing of the first and second shut-off valves.

For example, the brake fluid is sucked from the wheel brake cylinder into the variable-volume chamber if the first and second shut-off valves are closed and opened, respectively, when the volume of the variable-volume chamber is increased. In this case, the brake fluid which has been sucked into the variable-volume chamber is delivered therefrom to the master cylinder, by opening and closing the first and second shut-off valves, respectively, when the volume of the variable-volume chamber is then reduced. Thus, the pressure in the wheel brake cylinder is reduced.

If the first and second shut-off valves are opened and closed, respectively, when the volume of the variable-volume chamber is increased, the brake fluid is sucked from the pressurizing chamber of the master cylinder into the variable-volume chamber. In this case, the brake fluid which has been sucked into the variable-volume chamber is delivered therefrom to the wheel brake cylinder, by closing and opening the first and second shut-off valves, respectively, when the volume of the variable-volume chamber is then reduced. Thus, the wheel brake cylinder pressure is increased.

Further, the pressure in the wheel brake cylinder can be held at a constant level if needed, by closing the first and second shut-off valves or closing the second shut-off valve, or by suitably controlling pressure holding means different from the first and second shut-off valves, so as to hold the brake fluid within the wheel brake cylinder, as described in detail with respect to preferred embodiments of the invention.

It will be understood that the wheel brake cylinder pressure can be increased or reduced at a desired rate, by suitably controlling the operating speed of the electric motor of the reciprocating pump device and thereby adjusting the rate at which the pump device performs the suction and delivery strokes. Where the electric motor is operated at a constant speed, the rates of increase and decrease of the wheel brake cylinder pressure can be held constant, leading to higher accuracy of control of the wheel brake cylinder pressure than in the conventional hydraulic braking pressure control device. In this respect, it is noted that the amount of variation in the operating speed of an electric motor is comparatively small.

According to a first preferred form of the present invention, the first and second shut-off valves are solenoid-operated shut-off valves, and the synchronizing means includes volume change detecting means for detecting directions of change of a volume of the variable-volume chamber, and valve control means for opening and closing the first and second shut-off valves on the basis of an output of the volume change detecting means.

In the above preferred form of the invention, the solenoid-operated first and second shut-off valves are electrically controlled to be opened and closed in timed or synchronized relationship with the directions of change of the volume of the variable-volume chamber of the reciprocating pump device, so that the wheel brake cylinder pressure increased or decreased, or held if necessary. The volume change detecting means determines whether the volume of the variable-volume chamber is now increasing or decreasing, namely, whether the pump device is now in the sucking stroke or in the delivery stroke. For instance, the volume change detecting means uses a detector for detecting the position, speed of movement or acceleration of the pump piston or other movable member of the pump device. Alternatively, the volume change detecting means may detect the directions of change of the volume of the variable-volume chamber (determine whether the pump device is in the suction or delivery stroke) on the basis of a drive current of the electric motor of the pump piston drive device. In this instance, the volume change detecting means includes a current detector for detecting the electric current of the electric motor, and means for determining the changing state of the volume of the variable-volume chamber on the basis of an output of the current detector.

In the above first preferred form of this invention wherein the first and second shut-off valves are solenoid-operated shut-off valves, the opening and closing of these shut-off valves can be relatively easily controlled without timed relationship with the reciprocating movement of the pump piston of the pump device, as well as in timed relationship with the reciprocating movement. Accordingly, the wheel brake cylinder pressure can be relatively easily held at a constant level. Further, the present form of the invention facilitates the regulation of the pressures in the wheel brake cylinders in two braking systems, even where the same pump piston drive device is used for the reciprocating pump devices in the two braking systems.

According to one advantageous arrangement of the above first preferred form of the invention, the first and second shut-off valves, the reciprocating pump device and the synchronizing means are provided in each of two braking systems which have respective wheel brake cylinders for braking respective vehicle wheels, and the reciprocating pump devices of the two braking system use the same pump piston drive device such that the pump pistons of the reciprocating pump device have opposite operating phases. In this case, the volume change detecting means comprise shut-off valve closing means for closing both of the first and second shut-off valves in one of the two braking systems, and change direction determining means for determining the directions of change of the volume of the variable-volume chamber of each of the two braking systems on the basis of a drive current of the electric motor of the pump piston drive device while the first and second shut-off valves of the one braking system are both closed by the shut-off valve closing means.

In the above advantageous arrangement, the hydraulic braking pressure control device is used for controlling the two braking systems. To open and close the first and second solenoid-operated shut-off valves in timed relationship with the directions of change of the volume of the variable-volume chamber in each of the two braking systems, the directions of volume change of the variable-volume chambers of the two reciprocating pump devices of the two braking systems should be detected or determined independently of each other. In the present arrangement wherein the same pump piston drive device is used for the two pump devices, some means is required to correctly detect the directions of change of the volumes of the two variable-volume chambers of the two pump devices.

Where the volume change detecting means employs a detector for detecting the position of a movable member of each pump device, for example, the directions of volume change of the two variable-volume chambers of the two pump devices can be comparatively easily detected even where the same pump piston drive device is used for the two pump devices. Wherein the directions of volume change of the variable-volume chambers are detected on the basis of the drive current of the electric motor, as in the present arrangement, it is possible to detect that one of the two pump devices is in the delivery stroke (or suction stroke), but is not possible to determine which one of the two pump devices is in the delivery stroke (suction stroke).

Generally, the current of the electric motor increases during the delivery stroke of each pump device. In the present arrangement, the pump pistons of the two pump devices and the common pump piston drive device are disposed such that the pump pistons have opposite operating phases, so that the load acting on the electric motor used by the two pump devices is averaged, for example. In this arrangement, the waveform of the drive current of the electric motor has peak values at 180° intervals. These peak values indicate the delivery stroke of one of the two pump devices, but do not indicate which one of the two pump devices is now in the delivery stroke.

In the light of the above, the volume change detecting means in the present advantageous arrangement comprises shut-off valve closing means for closing both of the first and second shut-off valves in one of the two braking systems, while the two pump devices are operating. While the first and second shut-off valves are closed, the brake fluid is not sucked into the variable-volume chamber in the above-indicated one braking system, or delivered through a pressure-relief valve, whereby the drive current of the electric motor has a change from that in the normal state in which the shut-off valve closing means is not activated. Based on this change of the drive current while the first and second shut-off valves are both closed by the shut-off valve closing means, the change direction determining means determines the directions of change of the volume of the variable-volume chamber of each braking system, namely, determines which one of the two pump devices is in the delivery stroke (or suction stroke).

Thus, the above advantageous arrangement permits easy detection of the volume change directions of the variable-volume chambers of the pump devices of the two braking systems, even where the same pump piston drive device is used for the pump devices of the two braking systems. Accordingly, the present arrangement permits improved accuracy of control of the wheel brake cylinder pressure, while assuring simplified construction of the hydraulic braking pressure control device.

The above advantageous arrangement is desirably adapted such that the shut-off valve closing means comprises at least one of anti-lock control shut-off valve closing means and traction control shut-off valve closing means, and such that the change direction determining means comprises at least one of anti-lock control change direction determining means and traction control change direction determining means, which corresponds to the above-indicated at least one of anti-lock control shut-off valve closing means and traction control shut-off valve closing means. The anti-lock control shut-off valve closing means is adapted to close the first and second shut-off valves of a predetermined one of the two braking systems during the suction stroke of the pump piston of the reciprocating pump device of one of the two braking systems when the hydraulic braking pressure control device is operated in an anti-lock control mode. The traction control shut-off valve closing means is adapted to close the first and second shut-off valves of a predetermined one of the two braking systems during the delivery stroke of the pump piston of the reciprocating pump device of one of the two braking systems when the hydraulic braking pressure control device is operated in a traction control mode. The anti-lock control change direction determining means is adapted to determine the direction of change of the volume of the variable-volume chamber of each of the two braking systems depending upon whether the drive current increases above a predetermined threshold state during the delivery stroke of the pump piston immediately after termination of closure of the first and second shut-off valves by the anti-lock control shut-off valve closing means. The traction control change direction determining means is adapted to determine the direction of change of the volume of the variable-volume chamber depending upon the drive current increases above a predetermined threshold state while the first and second shut-off valves are held closed by the traction control shut-off valve closing means.

The desirable arrangement described above provides the volume change detecting means which is suitably operated in at least one of the anti-lock control operation and the traction control operation of the hydraulic braking pressure control device.

The amount of increase in the drive current of the electric motor when the first and second shut-off valves are closed differs depending upon whether fluid pressures are present in the master cylinder and the wheel brake cylinder, that is, depending upon whether the present hydraulic braking pressure control device is in the anti-lock control mode is in the traction control mode. The anti-lock control operation is performed when a fluid pressure is present in the master and wheel brake cylinders. On the other hand, the traction control operation is performed without a fluid pressure in the master and wheel brake cylinders. If the brake fluid is delivered from the pump device to the master or wheel brake cylinder when a fluid pressure is present in the master and wheel brake cylinders, a relatively large load acts on the electric motor of the pump piston drive device, and the drive current of the motor is relatively large. The load acting on the motor is relatively small when a fluid pressure is not present in the master and wheel brake cylinders.

When the first and second shut-off valves of one of the two braking systems are closed during the suction stroke of the pump device of the braking system in which the anti-lock control operation is performed, the pump device of the braking system in which the shut-off valves have been closed will initiate its delivery stroke immediately after the expiration of the period of closure of the shut-off valves (i.e., after the above-indicated suction stroke), if the braking system in which the anti-lock control operation is performed is the braking system in which the shut-off valves are closed. In this case, the brake fluid is not delivered from the pump device during the above-indicated delivery stroke since the brake fluid has not been sucked in the variable-volume chamber of the pump device of the braking system in which the shut-off valves have been closed. Accordingly, the drive current of the electric motor is relatively small. If the braking system in which the anti-lock control operation is performed is not the braking system in which the shut-off valves are closed, the pump device of the braking system in which the shut-off valves have not been closed will initiate the delivery stroke immediately after the expiration of the closure period of the shut-off valves. In this case, the brake fluid is delivered from the pump device during the delivery stroke since the brake fluid has been sucked in the variable-volume chamber of the pump device of the braking system in which the shut-off valves were held open. Accordingly, the drive current of the motor is relatively large. Therefore, it is possible to determine whether the pump device of each braking system is now in the suction or delivery stroke, or whether the volume of the variable-volume chamber of the pump device is increasing or decreasing, depending upon whether the drive current of the electric motor is relatively large or small during the period during which the first and second shut-off valves are closed in one of the two braking systems.

When the first and second shut-off valves of one of the two braking systems are closed during the delivery stroke of the pump device of the braking system in which the traction control operation is performed, the drive current of the electric motor while the shut-off valves are held closed is relatively large, if the braking system in which the traction control operation is performed is the braking system in which the shut-off valves are closed. In the traction control operation in which no fluid pressures are present in the master and wheel brake cylinders, the drive current during the delivery stroke is smaller than in the anti-lock control operation. If the first and second shut-off valves are closed during the delivery stroke, the brake fluid which has been sucked in the variable-volume chamber in the preceding suction stroke should be delivered therefrom through a suitable pressure relief valve, whereby the load acting on the motor during the delivery stroke becomes relatively large in the braking system in which the shut-off valves are closed. If the braking system in which the traction control operation is performed is not the braking system in which the shut-off valves are closed, the load which acts on the electric motor during the delivery stroke is relatively small since no fluid pressures are present in the master and wheel brake cylinders. Therefore, it is possible to determine whether the pump device of each braking system is now in the suction or delivery stroke, or whether the volume of the variable-volume chamber of the pump device is increasing or decreasing, depending upon whether the drive current of the electric motor is relatively large or small during the period during which the first and second shut-off valves are closed in one of the two braking systems.

According to a second advantageous arrangement of the above-indicated first preferred form of this invention, the volume change detecting means comprises means for detecting the directions of change of the volume of the variable-volume chamber on the basis of a drive current of the electric motor of the pump piston drive device.

According to a second preferred form of this invention, the hydraulic braking pressure control device further comprises a rapidly pressure reducing device including a reservoir passage connected to the portion of the fluid passage between the first and second shut-off valves, a reservoir connected to the reservoir passage, and a third shut-off valve which is provided in the reservoir passage and which is normally closed and is opened at least when a pressure in the wheel brake cylinder is reduced for the first time.

In the above second preferred form of the invention, the brake fluid discharged from the wheel brake cylinder by the pump device is accommodated in the reservoir when the wheel brake cylinder pressure is reduced for the first time, so that the wheel brake cylinder is rapidly reduced to effectively prevent an increase in the slipping tendency of the vehicle wheel, or to rapidly eliminate excessive slipping tendency of the wheel in the anti-lock control mode, for example. The third shut-off valve is normally closed, so as to prevent an undesirable flow of the brake fluid from the pressurizing chamber of the master cylinder into the reservoir during an ordinary brake application to the wheel, and thereby avoid an unnecessary large amount of operation of a brake operating member (e.g., brake pedal) due to such flow of the brake fluid into the reservoir. Further, the normally-closed third shut-off valve is also effective to avoid the filling of the reservoir with the brake fluid before the first reduction of the wheel brake cylinder pressure, which prevents the rapid reduction of the wheel brake cylinder.

If the storage capacity of the reservoir is large enough to accommodate the brake fluid discharged from the wheel brake cylinder even after the first reduction of the wheel brake cylinder pressure, the wheel brake cylinder pressure can be rapidly reduced upon the second pressure reduction of the see wheel brake cylinder, or the pressures in two or more wheel brake cylinders if provided in the same braking system can be rapidly reduced simultaneously.

According to one advantageous arrangement of the above second preferred form of this invention, the rapidly pressure reducing device includes a first pilot passage communicating with the third shut-off valve and the variable-volume chamber, and a second pilot passage which communicates with the third shut-off valve and which communicates with the first pilot passage through flow restricting means, the third shut-off valve being a pilot-operated shut-off valve which receives a first and a second pilot pressure in the first and second pilot passages, respectively, which first and second pilot pressures act on the pilot-operated shut-off valve in opposite directions, the pilot-operated shut-off valve being opened when the first pilot pressure is lower than the second pilot pressure by more than a predetermined value.

In the above advantageous arrangement, the first pilot pressure in the first pilot passage connected to the pump device becomes lower than the second pilot pressure in the second pilot passage which communicates with the first pilot passage via the flow restricting means, when the pump device is in the suction stroke with an increase in the volume of the variable-volume chamber. At this time, the pilot-operated shut-off valve is opened, and the brake fluid which is discharged from the wheel brake cylinder during the suction stroke of the pump device is permitted to flow into the reservoir, to that the wheel brake cylinder pressure is rapidly reduced this arrangement does not require any electrically controlled means for rapidly reducing the wheel brake cylinder with high reliability.

In the above arrangement, the first shut-off valve may be utilized as the flow restricting means. In this case, the first pilot passage is connected to a portion of the fluid passage between the master cylinder end the first shut-off valve, while the second pilot passage is connected to the portion of the fluid passage between the first and second shut-off valves.

When the wheel brake cylinder pressure is reduced for the first time after initiation of the anti-lock control operation, the first and second shut-off valves are closed and opened, respectively during the suction stroke of the pump device. As a result, there arises a pressure difference on the upstream and downstream sides of the first shut-off valve (a difference between the pressures in respective portions of the fluid passage connected to the master cylinder and wheel brake cylinder), whereby the pilot-operated shut-off valve (third shut-off valve) is opened, so that the brake fluid in the wheel brake cylinder is discharged into the reservoir while at the same time it is sucked into the pump device, resulting in a high rate of reduction of the wheel brake cylinder. Since the first shut-off valve is closed during the wheel brake cylinder pressure, this first shut-off valve functions as the flow restricting means for restricting flows of the fluid between the first and second pilot passages.

Alternatively, the flow restricting means may take the form of flow resistance applying means provided in a pump passage by which the variable-volume chamber is connected to the portion of the fluid passage between the first and second shut-off valves. The flow resistance applying means is adapted to apply a resistance to a flow of the brake fluid through the pump passage in at least a direction toward the variable-volume chamber, and the first and second pilot passages are connected to respective portions of the pump passage which are on opposite sides of the flow resistance applying means and which are respectively connected to the variable-volume chamber and the portion of the fluid passage between the first and second shut-off valves. When the pump device is activated to initiate the anti-lock control operation, there arises a pressure difference on the upstream and downstream sides of the flow resistance applying means (a difference between the pressures in the above-indicated portions of the pump passage), whereby the pilot-operated shut-off valve (third shut-off valve) is opened, so that the brake fluid in the wheel brake cylinder is discharged into the reservoir while at the same time it is sucked into the pump device, resulting in a high rate of reduction of the wheel brake cylinder.

According to a third preferred form of this invention, the synchronizing means comprises a motion transmitting device for transmitting a motion of a movable member of the pump piston drive device to a movable member of each of the first and second shut-off valves.

In the above third preferred form of the invention, the rotary motion of the movable member of the pump piston drive device is transmitted to the movable member of each of the first and second shut-off valves, so that the first and second shut-off valves are mechanically opened and closed in timed or synchronized relationship with the suction and delivery strokes of the pump device. This arrangement does not require any electrically controlled member for reliable synchronization of the operation of the first and second shut-off valves with the operation of the pump device.

According to one advantageous arrangement of the above third preferred form of the invention, the motion transmitting device comprises a motion transmitting device of solid member type including solid members which contact each other for transmitting the motion of the movable member of the pump piston drive device to the movable member of the first and second shut-off valves.

According to a second advantageous arrangement of the third preferred form of the invention, the motion transmitting device comprises a motion transmitting device of hydraulic pressure type which utilizes a hydraulic pressure to transmit the motion of the movable member of the pump piston drive device to the movable member of the first and second shut-off valves.

According to a fourth preferred form of this invention, the pump piston drive device comprises a cam rotated by the electric motor, and biasing means for biasing the pump piston toward a cam surface of the cam.

In this fourth preferred form of the invention, the pump piston is not held in contact with the cam surface of the cam when the brake fluid is not sucked into the variable-volume chamber during the suction stroke of the pump device, and the pump piston can be stopped at any position between the suction and delivery stroke ends. If the first and second shut-off valves in one of the two braking systems are closed to detect the directions of change of the volume of the variable-volume chamber as described above, for example, the cam can be rotated by the electric motor while the first and second shut-off valves are held closed, even after the pump piston of the pump device has moved to its delivery stroke end in the braking system in which the shut-off valves are closed.

According to a fifth preferred form of this invention, the synchronizing means comprises means for opening both of the first and second shut-off valves for fluid communication between the master cylinder and the wheel brake cylinder, during a portion of a period during which the first and second shut-off valves are closed and opened, respectively, for increasing a pressure of the brake fluid in the wheel brake cylinder.

In this preferred form of the invention, the brake fluid is discharged from the wheel brake cylinder to the master cylinder, and the wheel brake cylinder pressure is reduced, if the master cylinder pressure is lowered below the wheel brake cylinder as a result of reduction of the operating force acting on the brake operating member during an increase in the wheel brake cylinder pressure in the anti-lock control mode, because the master cylinder and the wheel brake cylinder are communicated with each other through the first and second shut-off valves which are open in the predetermined portion of the pressure increase period in the anti-lock control operation.

According to a sixth preferred form of the present invention, the synchronizing means comprises pressure change determining means for determining whether a pressure of the brake fluid in the wheel brake cylinder should be increased or decreased, and means for determining, on the basis of an output of the pressure change determining means, whether each of the first and second shut-off valves should be opened or closed.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which:

FIGS. 6A, 6B and 6C are timing charts showing the suction and delivery strokes of the reciprocating pump device and the opening and closing periods of the shut-off valves during pressure increase, hold and decrease in the traction control mode in the braking pressure control device of FIG. 1;

FIG. 7 is a view indicating combinations of pressure control of left and right wheel brake cylinders in the same braking system of the braking pressure control device of FIG. 1;

DETAILED DESCRIPTION OF THE PREFERRED EMBODIMENTS

Figure 1:
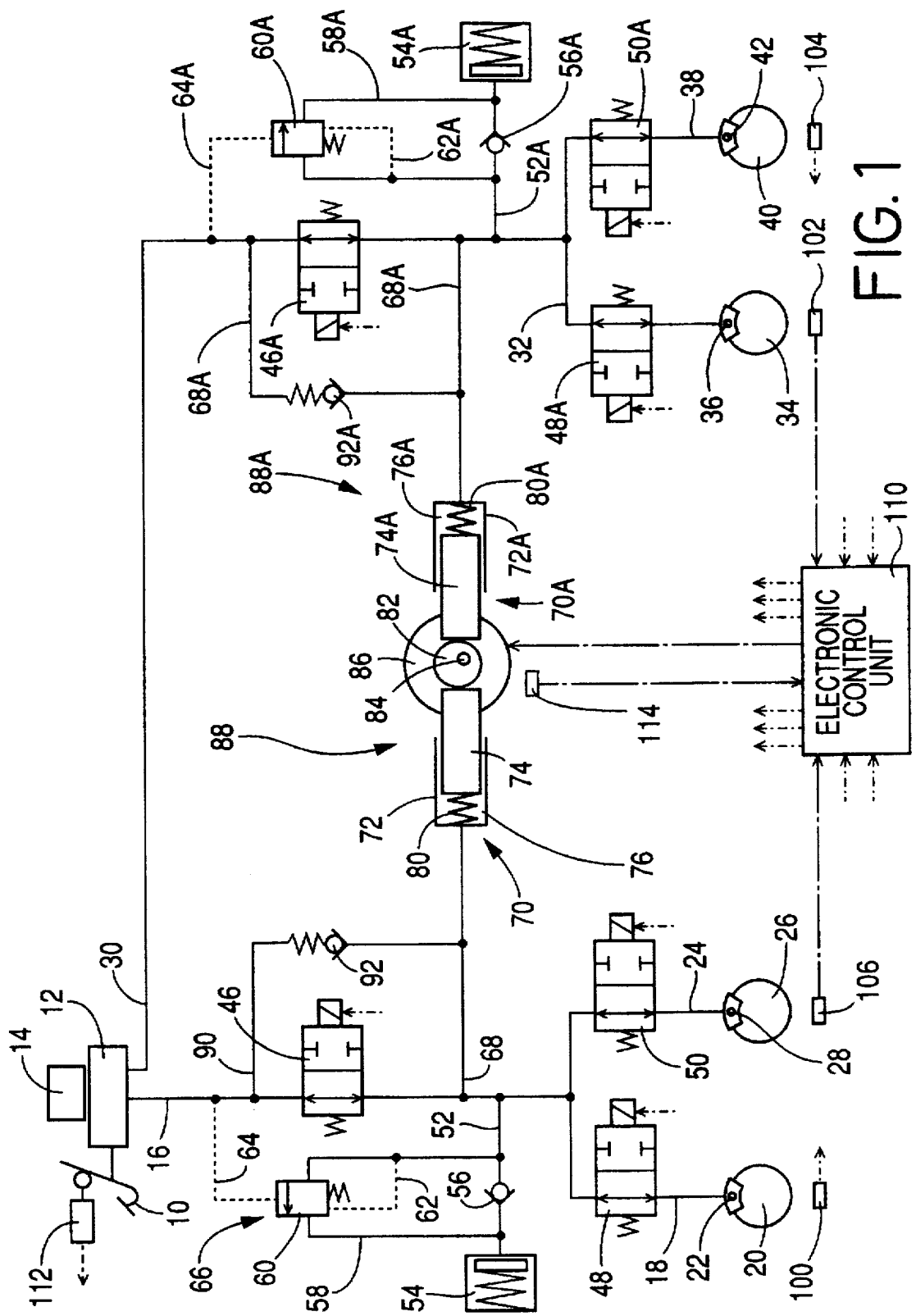
FIG. 1 is a schematic view illustrating a hydraulically operated braking apparatus equipped with one embodiment of a hydraulic braking pressure control device of this invention.

Referring first to FIG. 1, there is illustrated a hydraulically operated braking apparatus for a motor vehicle, which is equipped with a hydraulic braking pressure control device constructed according to a first embodiment of this invention. In FIG. 1, reference numeral 1 denotes a brake operating member in the form of a brake pedal. Upon depression of the brake pedal 10, brake fluid in two mutually independent pressurizing chambers of a master cylinder 12 is pressurized to the see pressure level corresponding to the amount of depression of the brake pedal 10. Reference numeral 14 denotes a reservoir mounted on the master cylinder 12 to supply this master cylinder with the brake fluid.

The fluid pressure generated in one of the two pressurizing chambers of the master cylinder 12 is applied through fluid passages 16, 18 to a brake cylinder 22 for braking a front left wheel 20 of the vehicle, and through fluid passages 16, 24 to a brake cylinder 28 for braking a rear right wheel 26 of the vehicle. The fluid pressure generated in the other pressurizing chamber of the master cylinder 12 is applied through fluid passages 30, 32 to a brake cylinder 36 for braking a front right wheel 34 of the vehicle, and through fluid passages 30, 38 to a brake cylinder 42 for braking a rear left wheel 40 of the vehicle. The braking apparatus is of a diagonal or X-crossing type. The front left and right wheels 20, 34 are steerable wheels and drive wheels which are driven by an engine of the vehicle. The X-crossing braking apparatus has a first braking system including the front left wheel brake cylinder 22 and the rear right wheel brake cylinder 28, and a second braking system including the front right wheel brake cylinder 36 and the rear left wheel brake cylinder 42. The first and second braking systems are provided with respective first and second hydraulic pressure control actuators, which are adapted to regulate the fluid pressures in the wheel brake cylinders 22, 28, 36, 42 for the four wheels 20, 26, 34, 40 in an anti-lock control mode independently of each other, and the fluid pressures in the front wheel brake cylinders 22, 26 of the front drive wheels 20, 26 in the traction control mode. The first and second hydraulic pressure actuators for the first and second braking systems are identical in construction with each other. In the interest of brevity and simplification, only the first hydraulic control actuator for the first braking system will be described by way of example. It is to be understood that t The same description applies to the second hydraulic pressure actuator.

In the fluid passage 16 indicated above, there is provided a normally-open first solenoid-operated shut-off valve 46. In the fluid passages 18, 24, there are provided two normally open second solenoid-operated shut-off valves 48, 50, respectively. A reservoir 54 is connected through a reservoir passage 52 to a portion of the fluid passage 16 which is between the first solenoid-operated shut-off valve 46 and the wheel brake cylinder 22, 28. In the reservoir passage 52, there is provided a check valve 56 which permits a flow of the brake fluid therethrough in a first direction from the reservoir 54 toward the wheel brake cylinders 22, 28, and inhibits a flow of the fluid therethrough in a second direction opposite to the first direction. The storage capacity of the reservoir 54 is determined to permit rapid reduction of the fluid pressures in the wheel brake cylinders 22, 28 when the fluid pressures in both of these cylinders 22, 28 are initially reduced upon simultaneous initiation of anti-lock pressure control operations for the front left wheel 20 and the rear right wheel 26.

A by-pass passage 58 is connected to the reservoir passage 52 such that the by-pass passage 58 by-passes the check valve 56. A third shut-off valve in the form of a pilot-operated shut-off valve 50 is provided in this by-pass passage 58. To the pilot-operated shut-off valve 60, there are connected two pilot passages 62, 64 so that the pressures on the downstream and upstream sides (as viewed in the direction from the master cylinder 12 toward the wheel brake cylinders 33, 38) of the first solenoid-operated shut-off valve 46 act on the pilot-operated shut-off valve 60 in the opposite directions. The pilot-operated shut-off valve 60 is opened when the upstream side pressure applied thereto through the pilot passage 64 becomes higher than the downstream side pressure applied thereto through the pilot passage 62, by more than a predetermined valve opening pressure difference. The reservoir passage 52, reservoir 54 and pilot-operated shut-off valve 60 cooperate with the first solenoid-operated shut-off valve 46 to constitute a rapid pressure reducing device 66.

A reciprocating pump device 70 is connected through a pump passage 68 to a portion of the above-indicated fluid passage 16 between the first solenoid-operated shut-off valve 46 and the fluid passages 18, 24 in which the second solenoid-operated shut-off valves 33, 38 are provided. The reciprocating pump device 70 has a cylinder housing 72 in which a pump piston 74 is fluid-tightly and slidably received. One of opposite end faces of the pump piston 74 cooperates with the cylinder housing 72 to define a variable-volume chamber 76 to which the pump passage 68 is connected.

The pump piston 74 is biased by a spring 80 disposed in the variable-volume chamber 76, so that the other end face of the pump piston 74 is held in contact with an outer surface of an eccentric cam 82. This eccentric cam 82 consists of a rotary shaft 86 and a circular disk fixed to the rotary shaft 84 much that the center of the eccentric cam 82 is offset from the axis of the shaft 86. The rotary shaft 84 is rotated about its axis by a pump drive motor 86, for thereby rotating the eccentric cam 82 about the shaft 84 so that the pump piston 74 is reciprocated by the eccentric cam 82 so as to increase and reduce the volume of the variable-volume chamber 76, whereby the brake fluid is sucked into and delivered from the chamber 76. The spring 80, eccentric cam 82 and pump drive motor 86 constitute a pump piston drive device 88.

The pump passage 58 is connected through a pressure relief passage 90 to a portion of the fluid passage 16 between the master cylinder 12 and the first solenoid-operated shut-off valve 46. In the pressure relief passage 90, there is provided a pressure relief valve 92 which is opened to permit the brake fluid to flow from the pump passage 68 toward the master cylinder 12 when the pressure in the pump passage 68 becomes higher than the pressure in the master cylinder 12 (hereinafter referred to as "master cylinder pressure") by more than a predetermined valve opening pressure difference.

The second hydraulic pressure control actuator for the second braking system has the same construction as the first hydraulic pressure control actuator which has been described above. In FIG. 1, reference numerals used for the components in the first hydraulic pressure control actuator are followed by character "A" to identify the corresponding components in the second hydraulic pressure control actuator.

The reciprocating pump device 70A of the second hydraulic pressure control actuator for the second braking system uses the same pump piston drive device 88 as used by the reciprocating pump device 70 of the first braking system. However, reference sign 88A is used in FIG. 1 to denote the pump piston drive device of the second hydraulic actuator. The pump piston 74A is biased by a spring 80A, so that one of opposite end faces of the pump piston 74A is held in contact with the eccentric cam 82, such that the points of contact of the two pump pistons 74, 74A are opposed to each other diametrically of the eccentric cam 82 or spaced from each other by 180° in the rotating direction of the eccentric cam 82. Accordingly, the suction and delivery of the brake fluid by the pump device 70A take place while the delivery and suction by the pump device 70 take place, respectively. In other words, the pump pistons 70 and 70A have opposite operating phases. Namely, the suction and delivery phases of the pump device 70A are opposite to those of the pump device 70.

The rotating speeds of the front left and right wheels 20, 34 and the rear left and right wheels 40, 26 are detected by respective wheel speed sensors 100, 102, 104, 106, and the output signals of these wheel speed sensors are applied to an electronic control unit 110. The electronic control unit 110 is constituted principally by a computer incorporating a read-only memory (ROM) which stores various control programs including speed and acceleration calculating programs, and anti-lock control and traction control programs. The speed and acceleration calculating programs are used to calculate the rotating speeds and acceleration values of the wheels 20, 34, 40, 26 and the running speed of the vehicle, on the basis of the output signals of the wheel speed sensors 100–106. The anti-lock and traction control programs are used to control the first and second solenoid-operated shut-off valves 46, 48, 50, 46A, 48A, 50A and the pump drive motor 86 for controlling the fluid pressures in the wheel brake cylinders 22, 28, 36, 42 in the anti-lock and traction control modes. To execute these control program, the electronic control unit 110 are adapted to receive output signals of a brake switch 112 and a current detector 114. The brake switch 112 detects an operation or depression of the brake pedal 10 by the vehicle driver, and the current detector 114 detects a drive current applied to the pump drive motor 86.

There will next be described an operation of the hydraulic braking pressure control device according to the present first embodiment.

When the brake pedal 10 is in a non-operated state, the first solenoid-operated shut-off vales 46, 46A and the second solenoid-operated shut-off valves 48, 50, 48A, 50A are placed in the states of FIG. 1, and the wheel brake cylinders 22, 28, 36, 42 are held in communication with the master cylinder 12. When the brake pedal 10 is depressed in this condition, the fluid pressure generated in the pressurizing chambers of the master cylinder 12 is applied to the wheel brake cylinders 22, 28, 36, 42 for braking the front left and right wheels 20, 34 and the rear left and right wheels 40, 26.

When the depression force acting on the brake pedal 10 is excessively large with respect to the friction coefficient of the road surface on which the vehicle is running, the slip of one or more of the wheels exceeds the upper limit of an optimum range, and the hydraulic braking pressure control device is operated in the anti-lock control mode. In this anti-lock control mode, the fluid pressure in the wheel brake cylinder 22, 28, 36, 42 in question is regulated by a suitable combination of pressure decrease, pressure increase and pressure hold operations. The pressure decrease operation is effected by a discharge flow of the brake fluid from the wheel brake cylinder 22, 28, 36, 42 by a suction stroke of the reciprocating pump device 70, 70A. The fluid discharged from the wheel brake cylinders is returned to the master cylinder 12 by a delivery stroke of the pump device 70, 70A. The pressure increase operation is effected by a discharge flow of the fluid from the master cylinder 12 by the suction stroke of the pump device 70, 70A and a supply flow of the fluid into the wheel brake cylinder 22, 28, 36, 42 by the delivery stroke of the pump device 70, 70A. The pressure hold operation is effected by inhibiting both of the discharge and supply flows of the fluid from and into the wheel brake cylinders 22, 28, 36, 42.

To increase, decrease and hold the pressure in the wheel brake cylinder in question by the suction and delivery of the fluid into and from the reciprocating pump device 70, 70A, the suction and delivery strokes of the pump device 70, 70A (more precisely, of the pump piston 74, 74A) should be suitably timed or synchronized with the opening and closing actions of the first and second solenoid-operated shut-off valves 46, 48, 50, 46A, 48A, 50A so as to effect the pressure increase, decrease and hold operations. Described in detail, decreasing the pressure in the wheel brake cylinder in question requires: closing of the first solenoid-operated shut-off valve 46 and opening of the second solenoid-operated shut-off valve 48, 50, 48A, 50A during the suction stroke of the pump device 70, 70A; and opening of the first solenoid-operated shut-off valve 46 and closing of the second solenoid-operated shut-off valve 48, 50, 48A, 50A during the delivery stroke of the pump device 70, 70A. On the other hand, increasing the wheel brake cylinder pressure requires: opening of the first solenoid-operated shut-off valve 46, 46A and closing of the second solenoid-operated shut-off valve 48, 50, 48A, 50A during the suction stroke of the pump device 70, 70A; and closing of the first shut-off valve 46, 46A and opening of the second shut-off valve 48, 50, 48A, 50A during the delivery stroke of the pump device 70, 70A. To hold the wheel brake cylinder pressure requires the first and second shut-off valves 46–50, 46A–50A to be held closed. As described below, however, the pressure increase and hold operations include a period during which the first and second shut-off valves 46–50, 46A–50A are both open to permit fluid communication between the master cylinder 12 and the wheel brake cylinder 22, 28, 36, 42 in question.

If no information is available as to whether the pump device 70, 70A is in the suction stroke or delivery stroke upon activation of the pump drive motor 86, it is not possible to determine whether each of the first and second solenoid-operated shut-off vales 46–50, 46A–50A should be opened or closed. In view of this, the electronic control unit 110 is adapted to determine whether the pump device 70, 70A is in the suction stroke or delivery stroke (suction period or delivery period) before an operation of the hydraulic pressure control actuator in the an anti-lock control mode is initiated since the same pump drive motor 86 is used for the two pump devices 70, 70A of the first and second braking systems, and since the suction and delivery phases of the pump device 70 are opposite to those of the pump device 70A, the detection of the suction and delivery strokes of one of the two pump devices 70, 70A results in automatic detection of the suction and delivery strokes of the other pump device.

Figure 2:
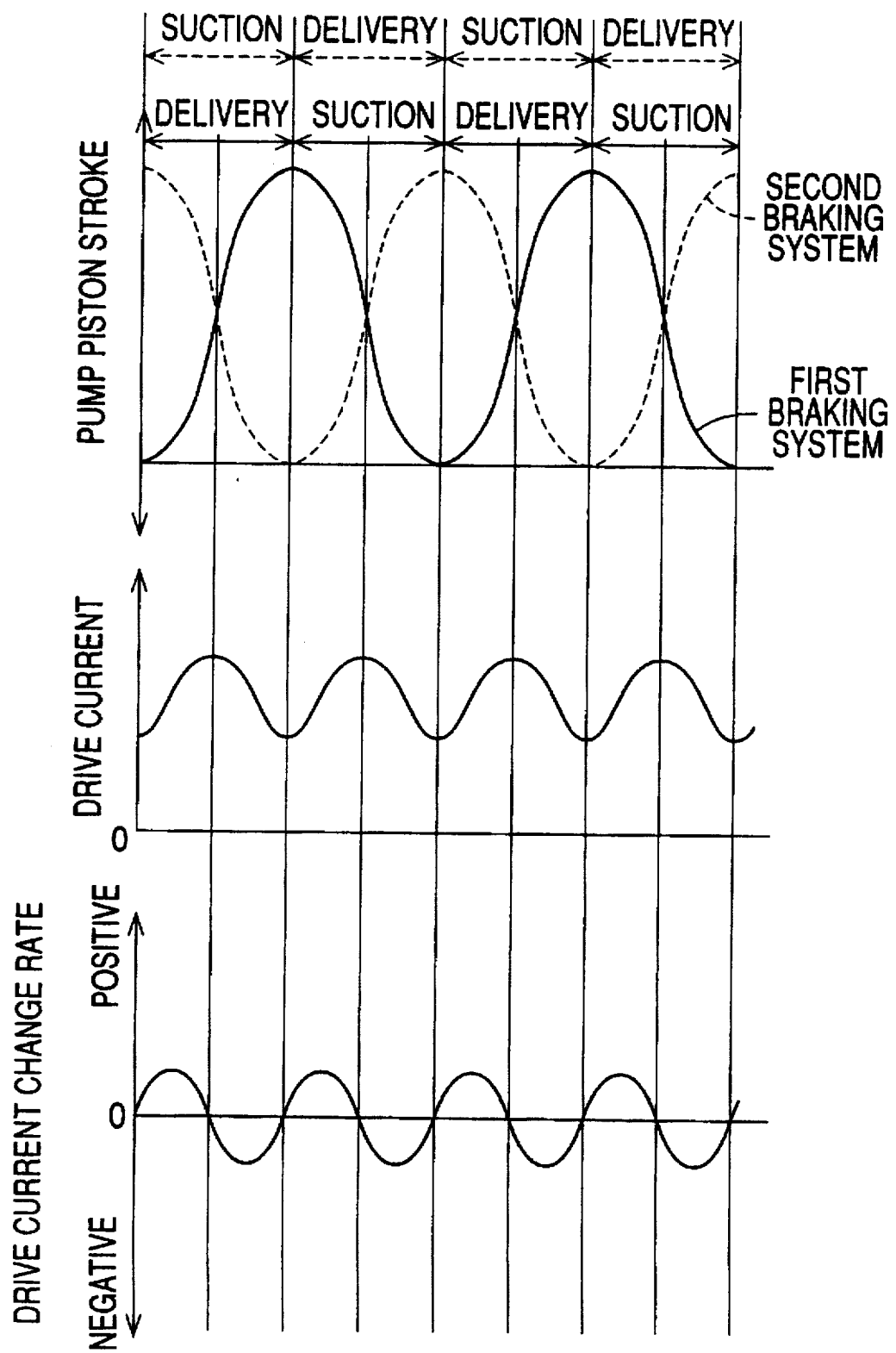
FIG. 2 is a graph indicating a relationship among a pump piston stroke of a reciprocating pump device which is an element of the braking pressure control device of FIG. 1, a drive current of a pump drive motor, and a change rate of the drive current.

The suction and delivery strokes of the pump devices 70, 70A can be determined depending upon the direction of change of the volume of the variable-volume chambers 76, 76A, namely, depending upon whether the volume of the chamber 76, 76A is increasing or decreasing. This determination is effected on the basis of a change of the drive current of the pump drive motor 86. To this end, the pump drive motor 86 is turned on when an anti-lock control operation of the hydraulic pressure control actuator is expected to be initiated soon. In this condition where the anti-lock operation is about to be initiated, the brake pedal 10 has already been depressed, and the brake fluid pressure in the master cylinder 12 (wheel brake cylinder 22, 28, 36, 42) acts on the pump piston 74, 74A. Accordingly, the drive current of the pump drive motor 86 is larger in the delivery stroke due to a load acting on the pump piston 74, 74A, than in the suction stroke. It is also noted that the delivery strokes (and the suction strokes) of the two reciprocating pump devices 70, 70A take place alternately as indicated in the graph of FIG. 2, and therefore an increase in the drive current in the delivery stroke of the pump device 70 and an increase in the drive current of the pump device 70A occur alternately, as also indicated in FIG. 2. Consequently, the change in the drive current indicates that one of the two pump devices 70, 70A is in the delivery stroke, but does not indicate which one of the two pump devices 70, 70A is in the delivery stroke.

To determine which one of the two pump devices 70, 70A is in the delivery stroke, the following determination is effected with the first and second solenoid-operated shut-off valves of one of the two braking systems being closed. Initially, the electronic control unit 110 calculates the rate of change of the drive current of the pump drive motor 86 on the basis of the output signal of the current detector 114 during a time period from the moment of activation of the pump drive motor 86 and the moment at which the fist and second solenoid-operated shut-off valves are closed as indicated above. Then, the electronic control unit 110 activates a suitable time counter to measure time intervals between adjacent zero-crossing points of the waveform of the calculated rate of change of the drive current as indicated in the third and sixth rows of FIG. 3. The zero-crossing points whose time intervals are to be measured may consist of only points negative-to-positive zero-crossing points at which the drive current change rate changes from a negative value to a positive value, or both the negative-to-positive zero-crossing points and positive-to-negative zero-crossing points at which the drive current change rate changes from a positive value to a negative value.

On the basis of the measured time intervals, the electronic control unit 110 estimates two halves of the operating period (cycle time) of the pump devices 70, 70A after the first and second solenoid-operated shut-off valves of one of the two braking systems are closed. The operating period or cycle time of the pump devices consists of the suction stroke time and the delivery stroke time, as indicated in FIG. 2. Then, these shut-off valves are closed at the first negative-to-positive zero-crossing point of the calculated drive current change rate (indicated in the third and sixth rows of FIG. 3) after the activation of the pump drive motor 86. At this zero-crossing point, one of the two pump devices 70, 70A initiates the suction stroke while the other pump device initiates the delivery stroke. The shut-off valves are held closed for a time equal to the estimated operating period or cycle time of the pump devices. The electronic control unit 110 determines which one of the two pump devices 70, 70A is in the delivery stroke (or suction stroke), depending upon whether the drive current change rate of the pump motor 86 in the latter half of the estimated operating period is higher than a predetermined threshold or not.

Figure 3:
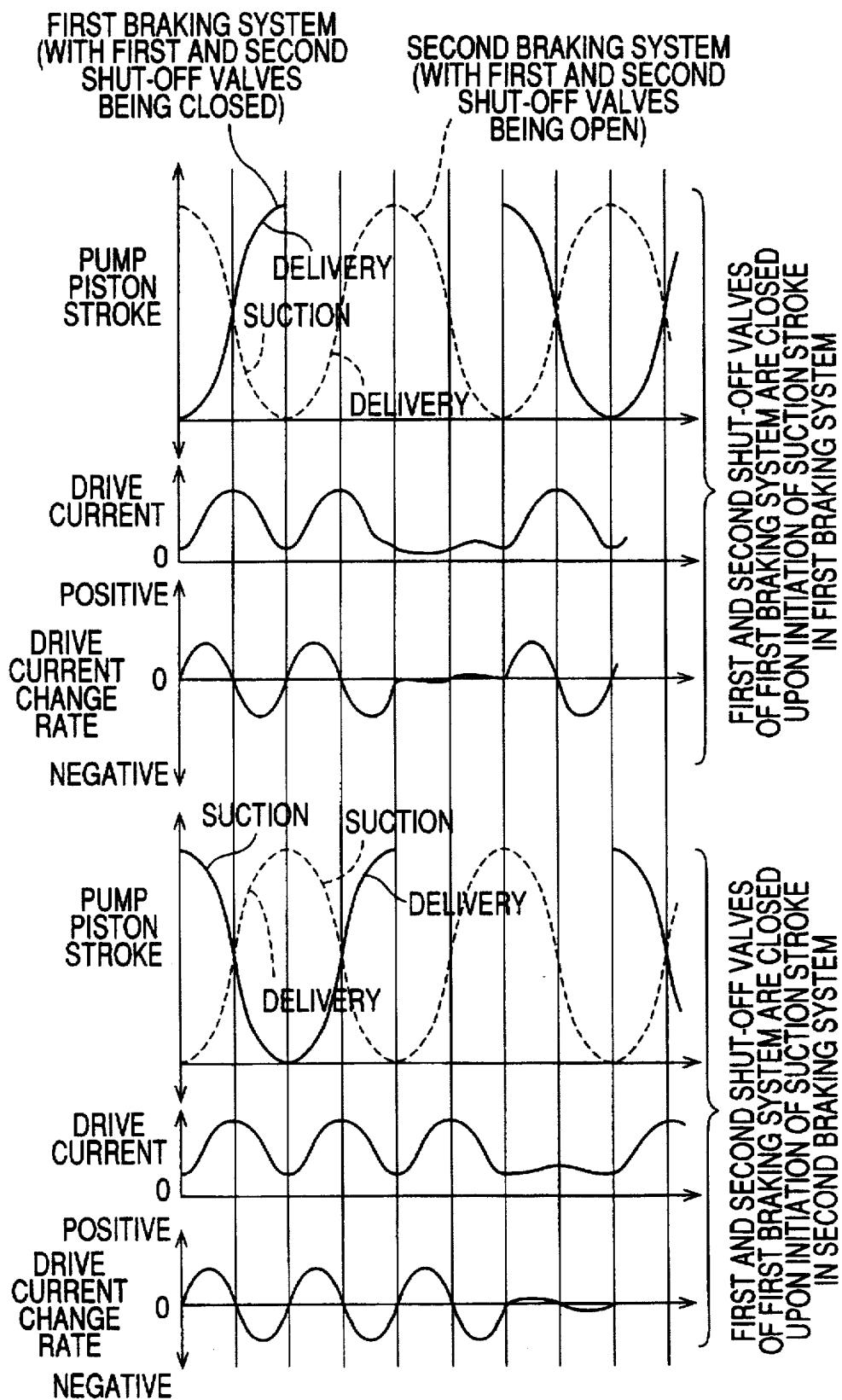
FIG. 3 is a graph indicating a relationship among the pump piston stroke, pump motor drive current and drive current change rate, upon determination of suction and delivery strokes of the reciprocating pump device in an anti-lock control mode in the braking pressure control device of FIG. 1.

If the first and second solenoid-operated shut-off valves 46–50 of the first braking system are closed at a point of time corresponding to the initiation of the suction stroke of the pump device 70 of the first braking system, as indicated in the first row of FIG. 3, the pump piston 74 cannot actually initiate the suction stroke and remains at the delivery stroke end (at which the suction stroke begins). Consequently, only the other pump device 70A performs the suction and delivery strokes. Namely, the pump device 70 does not perform the delivery stroke in the latter half of the period during which the first and second shut-off valves 46–50 are held closed. As a result, the drive current in this latter half will not considerable increase as indicated in the second row of FIG. 3, and the drive current change rate is not higher than the predetermined threshold as indicated in the third row of FIG. 3. The latter half corresponds to the delivery stroke of the pump device 70.

If the first and second solenoid-operated shut-off valves 46–50 of the first braking system are closed at a point of time corresponding to the initiation of the suction stroke of the pump device 70A of the second braking system, as indicated in the fourth row of FIG. 3, the pump piston 74 delivers the fluid to the master cylinder 12 through the pressure relief valve 92 in the latter half of the period during which the first and second shut-off valves 46–50 are held closed, since the fluid has been sucked into the variable-volume chamber 76 before the shut-off valves 46–50 are closed. Then, the pump piston 74 is stopped at the delivery stroke end. In this case, the other pump device 70A also performs the suction and delivery strokes. Namely, the pump device 70A delivers the fluid in the latter half of the period during which the shut-off valves 46–50 are held closed, whereby the drive current of the pump motor 86 is comparatively larger than in the case described in the preceding paragraph, as indicated in the fifth row of FIG. 3, and the drive current change rate is higher than the threshold, as indicated in the sixth row of FIG. 3.

Thus, the drive current change rate in the latter half of the period during which the first and second solenoid-operated shut-off valves 46–50 are held closed differs depending upon whether the shut-off valves 46–50 were closed at a point of time corresponding to the initiation of the suction stroke of the pump device 70 of the first braking device or at a point of time corresponding to the initiation of the suction stroke of the pump device 70A of the second braking device. If the drive current change rate is not higher than the threshold, it indicates that the shut-off vales 46–50 were closed at the point of time corresponding to the initiation of the suction stroke of the pump device 70 of the first braking system. It the drive current change rate is higher than the threshold, it indicates that the shut-off valves 46–50 were closed at the point of time corresponding to the initiation of the suction stroke of the pump device 70A of the second braking device. Accordingly, the determination as to whether the drive current change rate is higher than the predetermined threshold permits the detection of the directions of change of the volumes of the variable-volume chambers 76, 76A, which indicate whether each of the two pump devices 70, 70A is now in the suction stroke or delivery stroke. The thus detected directions of volume change of the variable-volume chambers 76, 76A are stored in a pump state memory of the computer of the electronic control unit 110. The stored volume change directions (indicative of the suction and delivery strokes) are subsequently updated at each of the subsequent negative-to-positive zero-crossing points of the drive current change rate, by inverting the volume change directions (suction and delivery strokes) at each negative-to-positive zero-crossing point. Thus, the electronic control unit 110 has the information indicative of whether each of the two reciprocating pump devices 70, 70A is currently in the suction or delivery stroke.

It is noted that the point of time at which the first and second solenoid-operated shut-off valves of one of the two braking systems are closed need not correspond to the initiation of the suction stroke of the pump device 70, 70A. This point of time may be suitably selected. IN this case, however, the determination as to whether the drive current change rate is higher than the threshold should be made for successive two delivery strokes of the pump device 70, 70A after the closure of the first and second shut-off valves 46–50.

If, for example, the first and second shut-off valves 46–50 are closed during the suction stroke of the pump device 70, the pump piston 74 delivers in the following delivery stroke the fluid which was sucked in by the time when the shut-off valves 46–50 were closed. In this case, the drive current change rate may exceed the predetermined threshold. If the drive current change rate does not exceed the threshold during the above-indicated delivery stroke, it is possible to determine that the pump device 70 was in the suction stroke. If the change rate exceeds the threshold, however, it is not possible to do so, and therefore another determination as to whether the drive current change rate exceeds the threshold or not should be effected during the next delivery stroke which begins one period after the end of the suction stroke during which the shut-off valves 46–50 were closed.

The determination as to whether each of the reciprocating pump device 70, 70A is in the suction or delivery stroke, that is, the detection of the directions of volume change of the variable-volume chambers 76, 76A is effected when an anti-lock control operation of at least one of the two hydraulic pressure control actuators of the first and second braking systems is about to be initiated. The anti-lock control operation is initiated for a certain wheel of the vehicle when the rotating speed of this wheel becomes lower than the vehicle running speed by more than a predetermined first threshold difference value. The above determination is initiated when the rotating speed of the wheel in question becomes lower than the vehicle speed by more than a predetermined second threshold difference value which is smaller than the first threshold difference value. To effect the determination, the first and second solenoid-operated shut-off valves 46–50, 46A–50A of one of the two braking systems are closed. This braking system whose first and second shut-off valves are closed is the braking system including the wheel brake cylinder which corresponds to the wheel whose amount of slip on the road surface increases at the highest rate and for which the anti-lock control operation is expected to be initiated first, that is, before the anti-lock control operation is initiated for the other wheel brake cylinders. The closure of the first and second solenoid-operated shut-off valves results in maintaining the pressure in the wheel brake cylinder in question, and an increase in the slip amount of the corresponding wheel is prevented or restricted.

If the condition for initiating the anti-lock control operation is satisfied, that is, if the difference of the rotating speed of the wheel in question from the vehicle speed is larger than the predetermined first threshold difference value when the determination of the suction or delivery stroke of the corresponding pump device 70, 70A is terminated, the anti-lock control operation is initiated for the wheel in question. If the front left wheel 20 or the rear right wheel 26 has a rapidly increasing slipping tendency and the first and second solenoid-operated shut-off valves 46–50 of the first braking system were closed during the above determination, the shut-off valves 46–50 are suitably opened and closed in timed or synchronized relationship with the suction and delivery strokes of the pump device 70 in the anti-lock control operation, so as to initially reduce the pressure in the wheel brake cylinder 22, 28 corresponding to one of the front left and rear right wheels 20, 26 whose slipping tendency increases at a higher rate than the other, that is, so as to discharge the fluid from that wheel brake cylinder 22, 28.

If the condition for initiating the anti-lock control operation for the wheel brake cylinder 22, 28 is not satisfied at the end of the determination of the suction or delivery stroke of the pump device 70, the first and second solenoid-operated shut-off valves 46–50 are opened while the pump drive motor 86 is kept on. Then, the electronic control unit 110 continues to monitor whether the condition for initiating the anti-lock control operation is satisfied or not. If this condition is satisfied within a predetermined time, the anti-lock control operation is initiated. If not, the pump drive motor 86 is turned off.

The wheel cylinder pressure is reduced for the first time after the initiation of the anti-lock control operation, the rate of decrease of the wheel cylinder pressure is comparatively high. If, for example, the slipping tendency of the front left wheel 20 increases at a higher rate than that of the rear right wheel 26 and the anti-lock control operation is initiated for the front left wheel 20 before initiation of the anti-lock control operation for the rear right wheel 26, the first solenoid-operated shut-off valve 46 is closed while the second solenoid-operated shut-off valve 50 is opened so that the pressurized fluid is discharged from the front left wheel brake cylinder 22 into the variable-volume chamber 76 of the pump device 70, whereby the pressure downstream of the first shut-off valve 46 (which corresponds to the pressure in the wheel brake cylinder 22) is made lower than the master cylinder pressure. As a result, the pilot-operated shut-off valve 60 is opened to permit the pressurized fluid to be discharged from the wheel brake cylinder 22 into the reservoir 54. Thus, the pressure in the wheel brake cylinder 22 is rapidly reduced.

While the pressure in the front left wheel brake cylinder 22 is rapidly reduced, the second shut-off valve 50 for the rear right wheel 26 is held closed, to inhibit a discharge flow of the fluid from the rear right wheel brake cylinder 28. If the anti-lock control operation is initiated for the rear right wheel 26 during or immediately after the rapid reduction of the pressure in the front left wheel brake cylinder 22, the second shut-off valve 50 is opened, and the fluid is discharged from the rear right wheel brake cylinder 28 into the reservoir 54, whereby the pressure in the wheel brake cylinder 28 is rapidly reduced. If the second pressure reduction or decrease is initiated for the front left wheel 20 before the anti-lock control operation is initiated for the rear right wheel 26, this second pressure reduction is also effected at a comparatively high rate.

When the reservoir 54 is filled with the brake fluid in any operating condition of the braking apparatus, the fluid cannot flow into the reservoir 54 even with the pilot-operated shut-off valve 60 being open. In this state, the rapid pressure reduction of the wheel brake cylinders 20, 28 is not possible. In this respect, it is noted that the pressure of the fluid in the reservoir 54 is only slightly higher than the atmospheric pressure and is lower than the pressure in the fluid passages 16, 18, 24, the fluid will not be discharged from the reservoir 54 during the anti-lock control operation. The pilot-operated shut-off valve 60 is closed when the pressure in the wheel brake cylinder 22, 28 becomes higher than the master cylinder pressure after the termination of the anti-lock control operation, so that the fluid is returned from the reservoir 54 to the master cylinder 12 through the check valve 56.

Figure 5A:
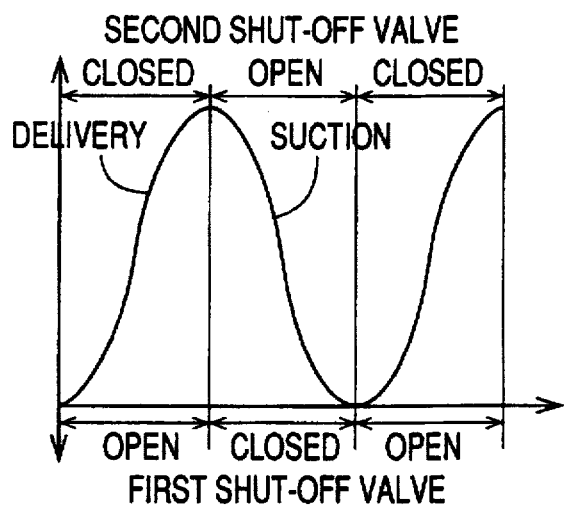
FIGS. 5A, 5B and 5C are timing charts showing the suction and delivery strokes of the reciprocating pump device and periods of opening and closing of first and second shut-off valves during pressure decrease, hold and increase in the anti-lock control mode in the braking pressure control device of FIG. 1.
Figure 5B:
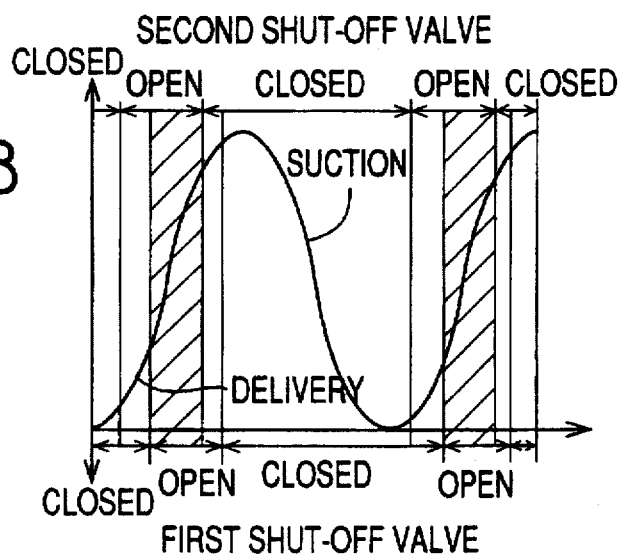
Figure 5C:
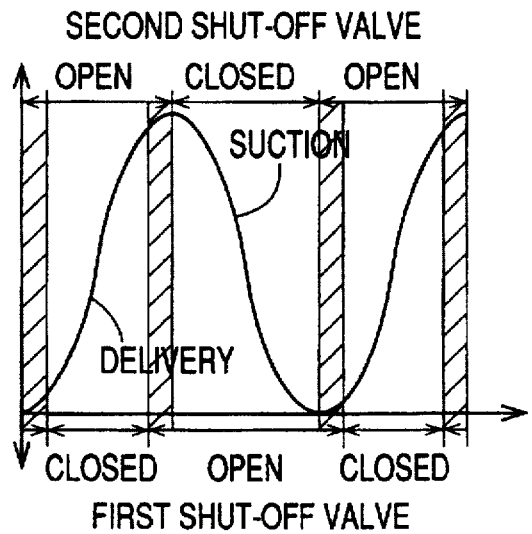

To effect the pressure decrease, pressure hold and pressure increase operations for the wheel brake cylinder 22, 28, 36, 42, the first and second solenoid-operated shut-off valves 46–50, 46A–50A are opened and closed in synchronization with the suction and delivery strokes of the reciprocating pump device 70, 70A, as indicated in FIGS. 5A, 5B and 5C, respectively.

To effect the pressure decrease operation, the first and second solenoid-operated shut-off valve are closed and opened, respectively, during the suction stroke of the pump device, and are opened and closed, respectively, during the delivery stroke of the pump device, as indicated in FIG. 5A.

To effect the pressure hold operation, the first and second shut-off valves are closed for a substantive portion of the anti-lock control operation, as indicated in FIG. 5B, but are opened for a relatively short time corresponding to a portion of the delivery stroke of the pump device, as indicated by hatched areas in FIG. 5B, to temporarily establish the fluid communication between the wheel brake cylinder and the master cylinder 12.

To effect the pressure increase operation, the first shut-off valve is closed for a substantive portion of the anti-lock control operation while the second shut-off valve is held open, as indicated FIG. 5C. The first shut-off valve is opened for relatively short times corresponding to the initial and terminal portions of the delivery stroke of the pump device, as indicated by hatched areas in FIG. 5C, to temporarily the fluid communication between the wheel brake cylinder and the master cylinder 12.

When the fluid communication between the master cylinder 12 and the wheel brake cylinder is temporarily established during the pressure hold and increase operations, the fluid flows from the master cylinder 12 into the wheel brake cylinder so as to increase the wheel brake cylinder pressure since the master cylinder pressure is generally higher than the wheel brake cylinder pressure. If the master cylinder pressure is lowered below the wheel brake cylinder pressure as a result of an operation of the brake pedal 10 toward the non-operated position, the fluid is discharged from the wheel brake cylinder and the wheel brake cylinder pressure is reduced. Consequently, the amount of increase of the wheel brake cylinder pressure during the pressure increase operation is reduced so that the wheel brake cylinder pressure tends to be reduced by the overall anti-lock control operation. If the brake pedal 10 is operated toward the non-operated position during the pressure hold operation, the wheel brake cylinder pressure is reduced during the pressure hold operation, and the wheel brake cylinder pressure tends to be reduced by the overall anti-lock control operation.

The electronic control unit 110 selects one of the pressure increase, decrease and hold operations, depending upon the slipping states of the vehicle wheels such as the slip amounts, slip ratios, and acceleration values of the wheels, and controls the first and second solenoid-operated shut-off valves 46–50, 46A–50A to be opened and closed according to the selected pressure pressure control operation. The rate of the pressure increase or decrease of the wheel in question can be changed as needed by controlling the operating speed of the pump drive motor 86. The electronic control unit 110 determines the optimum pressure increase and decrease rates and controls the drive current to be applied to the pump drive motor 86 so as to establish the determined optimum pressure increase and decrease rates. The pressure increase and decrease rates correspond to the operating period or cycle time (suction stroke time plus delivery stroke time) of the pump device 70, 70A, and the operating period (opening and closing frequency) of the first and second shut-off valves 46–50, 46A–50A changes with the operating period of the pump device 70, 70A.

As described above, the present embodiment is adapted such that the first and second solenoid-operated shut-off valves 46–50, 46A–50A are both opened for the predetermined times during the pressure increase and hold operations, so that the fluid pressurized by the master cylinder 12 is usually supplied to the wheel brake cylinder 22, 28, 36, 42 with a result of an increase in the wheel brake cylinder pressure. This fact is taken into consideration in determining the rates at which the wheel brake cylinder pressure is increased or reduced in the pressure increase and decrease operations.

While the first solenoid-operated shut-off valve 46, 46A of each braking system is used commonly for the front left and right right wheels 20, 25 or the rear left and front right wheels 40, 34, the two second solenoid-operated shut-off valves 48, 50, 48A, 50A are provided for the respective left and right wheels 20, 40 and 40, 34. By opening and closing these two second shut-off valves 48, 50, 48A, 50A independently of each other, the pressures in the left and right wheel brake cylinders 22, 28 and 42, 36 can be regulated independently of each other. FIG. 7 indicates possible combinations of the pressure control operations (pressure increase, decrease and hold) of the left and right wheel brake cylinders 22 and 28, 42, 36.

As indicated in FIGS. 5A, 5B and 5C, the opening and closing pattern of the first solenoid-operated shut-off valve differs depending upon the selected one of the pressure increase, pressure decrease and pressure hold operations. Where the pressure hold operation is selected for one of the left and right wheel brake cylinders of the braking system in question while the pressure increase or decrease operation is selected for the other wheel brake cylinder, the opening and closing pattern of the first shut-off valve 46, 46A for the left wheel brake cylinder is different from that for the right wheel brake cylinder. In this case, the first shut-off valve is opened and closed increase or decrease the wheel brake cylinder pressure. If the first shut-off valve is opened and closed to hold the wheel brake cylinder pressure, the wheel brake cylinder pressure cannot be increased or decreased. In the present embodiment, the first shut-off valve is opened and closed to increase or decrease the wheel brake cylinder pressure, since the wheel brake cylinder pressure can be held by the second shut-off valve.

The determination of the suction and delivery strokes of the pump devices 70, 70A or the detection of the volume change directions of the variable-volume chambers 76, 76A is effected at a predetermined time interval even after the initiation of an anti-lock control operation. As described above, the volume change directions (suction and delivery strokes) stored in the pump stage memory are inverted each time the negative-to-positive zero-crossing point of the drive current change rate of the pump drive motor 86 is detected. If this negative-to-positive zero-crossing point is detected due to noise, therefore, the volume change directions are inverted irrespective of the actual operating state of the pump device 70, 70A, namely, regardless of whether the pump device is actually in the suction stroke or delivery stroke. This inversion due to noise leads to inadequate anti-lock control operation of the braking system.

It is noted that an inadequate anti-look control operation of the braking system results in an excessively long pressure decrease or increase operation. In view of this fact, the inadequate anti-lock control operation due to inaccurate information stored in the pump state memory can be detected by detecting the excessively long pressure decrease or increase operation by providing a time counter for measuring the duration of the pressure decrease or increase operation, and detecting means for detecting the inadequate anti-lock control operation on the basis of the measured pressure decrease or increase operation as compared with a threshold time. The detection of the volume change directions of the variable-volume chamber 76, 76A may be effected when the inadequate anti-lock control operation is detected by the detecting means.

There will be described the traction control operation of the present braking apparatus.

When the slip ratio of at least one of the left and right front drive wheels 20, 34 exceeds a predetermined limit during starting or acceleration of the vehicle, the pump drive motor 86 is activated, and the first and second solenoid-operated shut-off valves 46–50, 46A–50A are suitably opened and closed to supply the pressurized brake fluid from the pump device 70, 70A to the wheel brake cylinder or cylinders 22, 36 for braking the excessively slipping wheel or wheels 20, 34.

In the traction control operation, too, the volume change directions of the variable-volume chambers 76, 76A of the reciprocating pump device 70, 70A are detected on the basis of the rate of change of the drive current of the pump drive motor 86, in the manner as described above with respect to the anti-lock control operation. To this end, the pump drive motor 86 is activated when the condition for initiating the traction control operation is about to be satisfied. The traction control operation is initiated when the rotating speed of the front drive wheel 20, 34 in question becomes higher than the vehicle speed by more than a predetermined first threshold difference value, and the pump drive motor 86 is activated when the rotating speed of the front drive wheel 20, 34 becomes higher than the vehicle speed by more than a predetermined second threshold difference value which is smaller than the first threshold difference value. Then, the first and second solenoid-operated shut-off valves 46–50, 46A–50A of one of the first and second braking systems are closed at a point of time corresponding to the initiation of the delivery stroke of the pump device 70, 70A, namely, at the first negative-to-positive zero-crossing point of the drive current change rate of the pump motor 86, as indicated in the third and sixth rows of FIG. 4. The first and second shut-off valves are held closed during a half of the operating period or cycle time of the pump device 70, 70A.

In the traction control operation, the master cylinder pressure is zero, and the load acting on the pump device 70, 70A during the delivery stroke of the pump device 70, 70A is relatively small in the braking system in which the first and second shut-off valves 46–50, 45A–50A are both open. In this braking system, the drive current of the pump drive motor 86 is relatively small. If the first and second shut-off valves are closed in the braking system in which the delivery stroke of the pump device is initiated upon closure of the first and second shut-off valves, the brake fluid sucked into the variable-volume chamber 76, 76A of that braking system before the initiation of the delivery stroke (before the closure of the first and second shut-off valves) is delivered through the pressure relief valve 92 during the delivery stroke, and the load acting on the pump device 70, 70A is relatively large, resulting in an increase in the drive current of the pump drive motor 86, whereby the drive current change rate exceeds the predetermined threshold. If the first and second shut-oil valves of one of the two braking systems are closed upon initiation of the delivery stroke of the pump device of the other braking system, the load acting on the pump device 70, 70A is relatively small, and the drive current of the pump drive motor 86 is relatively small, so that the drive current change rate will not exceed the predetermined threshold.

Figure 4:
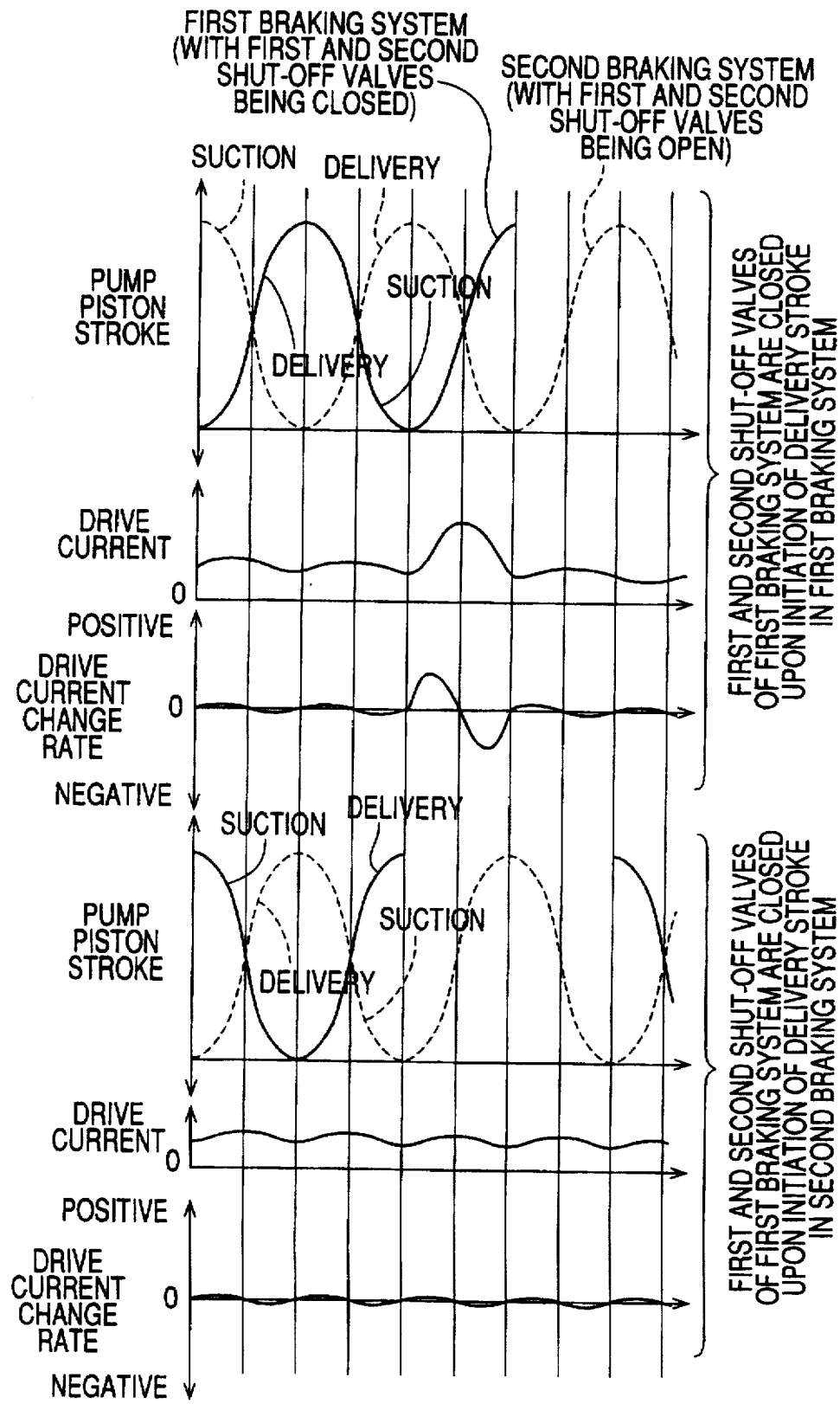
FIG. 4 is a graph indicating a relationship among the pump piston stroke, pump motor drive current and drive current change rate, upon determination of the suction and delivery strokes of the reciprocating pump device in a traction control mode in the braking pressure control device of FIG. 1.

Described more specifically referring to FIG. 4, if the first and second solenoid-operated shut-off valves 46–50 of the first braking system are closed at a point of time corresponding to the initiation of the delivery stroke of the pump motor 70 of this first braking system, as indicated in the first row of FIG. 4, the brake fluid which was sucked into the variable-volume chamber 76 during the preceding suction stroke is delivered therefrom through the pressure relief valve 92, so that the drive current is relatively large as indicated in the second row in FIG. 4, whereby the drive current change rate exceeds the predetermined threshold as indicated in the third row.

If the first and second shut-off valves 46–50 of the first braking system are closed at a point of time corresponding to the initiation of the delivery stroke of the pump motor 70A of the second braking system as indicated in the fourth row in FIG. 4, the pump device 70 of the first braking system is at the beginning of the suction stroke when the shut-off valves 46–50 are closed. Accordingly, the load acting on the pump device 70 is relatively small. Further, although the pump device 70A of the second braking system is at the beginning of the delivery stroke, the load acting on this pump device 70A is relatively small since the first and second shut-off valves 46A–50A re open, consequently, the drive current is relatively small as indicated in the fifth row of FIG. 4, and the drive current change rate will not exceed the predetermined threshold as indicated in the sixth row of the figure.

Therefore, it is possible to determine that the pump device of the braking system in which the first and second shut-off valves were closed was at the beginning of the delivery stroke upon closure of the first and second shut-off valves, if the drive current change rate exceeds the predetermined threshold during the closure of the first and second shut-off valves, and that the pump device of the braking system in which the first and second shut-off valve were not closed was at the beginning of the delivery stroke upon closure of the first and second shut-off vales, if the drive current chance rate does not exceed the threshold.

The thus detected volume change directions of the variable-volume chambers 76, 76A (suction and delivery strokes of the pump devices 70, 70A) are stored in the pump state memory, and the stored volume change directions are inverted upon detection of each negative-to-positive zero-crossing point of the detected drive current change rate.

If the condition for initiating the traction control operation is satisfied when the detection of the volume change directions of the variable-volume chambers 76, 76A is terminated, the first solenoid-operated shut-off valve 46, 46A and the second solenoid-operated shut-off valve 48, 48A are suitably opened and closed according to the currently stored volume change directions, so as to increase, decrease or hold the wheel brake cylinder pressure in question, while the second solenoid-operated shut-off valves 50, 50A corresponding to the non-drive rear left and right wheels 40, 26 are held closed to inhibit brake application to the rear left and right wheels 40, 26.

If the condition for initiating the traction control operation for the front wheel brake cylinder 22, 36 is not satisfied at the end of the detection of the volume change directions, the electronic control unit 110 continues to monitor whether the condition for initiating the traction is satisfied or not, while the pump drive motor 86 is kept operated. If this condition is satisfied within a predetermined time, the traction control operation is initiated. If not, the pump drive motor 86 is turned off.

In the traction control operation, the pressure increase is effected by opening and closing the first and second shut-off valves, as indicated in FIG. 6A. To effect the pressure hold, the first and second shut-off valves are both closed, as indicated in FIG. 6B. The pressure decrease is effected as indicated in FIG. 6C, in the same manner as in the anti-lock control operation as indicated in FIG. 5C. As in the anti-lock control operation, the rates of the pressure increase and decrease can be changed in the traction control operation, by controlling the operating speed of the pump drive motor 86.

The detection of the volume change directions of the variable-volume chambers 76, 76A (determination of the suction and delivery stokes) of the pump devices 70, 70A is effected at a predetermined time interval even after the traction control operation is initiated, or when a predetermined condition is satisfied, for example, when an inadequate traction control operation is detected. This arrangement prevents erroneous volume change directions of the variable-volume chambers 76, 76A stored in the pump stage memory, which would occur due to noise generation and which do not reflect the actual operating states (suction and delivery strokes) of the pump devices 70, 70A.

If a predetermined condition for terminating the traction control operation is satisfied, the first and second shut-off valves 45, 48, 46A, 48A, 50, 50A are both opened, and the pump drive motor 86 is turned off. The predetermined condition indicated above may be an increase of the vehicle running speed above a predetermined limit.

In the present hydraulically operated braking apparatus constructed as described above, the wheel cylinder pressures are regulated in the anti-lock or traction control mode by the reciprocating pump devices 70, 70A, which are adapted to supply and discharge the pressurized brake fluid to and from the wheel brake cylinders, as needed. Further, the operating speed of the pump drive motor 86 can be controlled as desired, so that the rates of increase and decrease of the wheel brake cylinders can be suitably controlled, irrespective of the wheel cylinder pressures.

In the pump piston drive device 88, cam followers in the form of the pump pistons 74, 74A are forced against the cam surface of the eccentric cam 82 under the biasing force of biasing means in the form of the springs 80, 80A, so that the cam followers 74, 74A can remain at the positions corresponding to the deliver stroke ends even when the pump devices are in the suction strokes. In the first or second braking system in which the first and second solenoid-operated shut-off valves 46–50, 46A–50A are closed to detect the volume change directions of the variable-volume chambers 76, 76A (determine the suction and delivery strokes), the cam follower 74, 74A remains at the delivery stroke end in the absence of a flow of the brake fluid into the variable-volume chamber 76, 76A due to the closure of the shut-off valves.

If the first and second shut-off valves are closed in the braking system in which the pump device is about to initiate the suction stroke, this pump device cannot suck in the brake fluid and delivery the brake fluid, although the pump drive motor 86 is kept operated. To avoid damages of the pump device and the pump drive motor 86, therefore, the pump piston 74, 74A should not be moved in the suction direction by the pump drive motor 86. This object is achieved in the present embodiment wherein the pump pistons 74, 74A are normally held in contact with the eccentric cam 82 by the springs 80, 80A, but are not forcedly moved by the pump drive motor 86 in the suction direction.

It will be understood from the foregoing explanation of the present embodiment that the electrically operated pump drive motor 86 serves as a drive source, while the eccentric cam 82 and the spring 80, 80A constitute a motion converting mechanism for converting the rotary motion of the drive source into the linear reciprocating motion of the pump piston 74, 74A. The drive source and the motion converting mechanism cooperate with each other to constitute the pump piston drive device 88. It will also be understood that the electronic control unit 110 includes shut-off valve closing means for closing the first and second solenoid-operated shut-off valves 46–50, 46A–50A in the anti-lock control operation, shut-off valve closing means for closing these shut-off valves in the traction control operation, volume change detecting means for detecting directions of change of the volume of the variable-volume chamber 76, 76A in the anti-lock control operation, and volume change detecting means for detecting the above-indicated volume change directions in the traction control operation.

It will further be understood that the first solenoid-operated shut-off valve 46, 46A serves as means for restricting flows of the brake fluid therethrough.

It will further be understood that the spring 80, 80A and eccentric cam 82 serve as a device for permitting the reciprocating pump device to remain at its delivery stroke end without its movement to initiate its suction stroke when the first and second solenoid-operated shut-off valves are closed for the purpose of detecting the volume change directions of the variable-volume chamber 76, 76A in the anti-lock control operation of the braking apparatus. Further, the pressure relief valve 92, 92A serve as a device for permitting the delivery of the brake fluid under a flow resistance not smaller than a predetermined value, from the variable-volume chamber 76, 76A of the pump device 70, 70A of the braking system in which the first and second shut-off valves are closed to detect the volume change directions of the variable-volume chamber 76, 76A.

While the above embodiment is adapted to detect the volume change directions of the variable-volume chambers 76, 76A at a predetermined time interval or when needed even after the termination of the anti-lock or traction control operation, such subsequent detection of the volume change directions is not essential. In this case, the detection is effected only once shortly before the initiation of the anti-lock or traction control operation.

In the above embodiment, the detection of the volume change directions of the variable-volume chambers 76, 76A is effected by first closing the first and second solenoid-operated shut-off valves at the first negative-to-positive zero-crossing point of the change rate of the drive current of the pump drive motor 86. The detection is possible without detecting the negative-to-positive zero-crossing of the drive current change rate. In other words, the detection is possible regardless of the moment at which the first and second shut-off valves are closed.

If the first and second solenoid-operated shut-off valves of one of the first and second braking systems are closed during the suction stroke of the pump device of that braking system to detect the volume change directions of the variable-volume chambers, a certain amount of the brake fluid which has been sucked into the variable-volume chamber of the braking system before the closure of the shut-off valves is delivered in the following delivery stroke. In this case, the drive current in the delivery stroke is intermediate, and the drive current change rate may exceed the predetermined threshold value, resulting in erroneous detection of the volume change directions of the variable-volume chambers (erroneous determination of the suction or delivery stroke of the pump devices). After the delivery of the brake fluid from the variable-volume chamber of the braking system in which the first and second shut-off valves were closed, the brake fluid is not sucked into that variable-volume chamber in the next suction stroke and is not delivered in the following delivery stroke, so that the drive current will not increase to such an extent that causes the drive current change rate to exceed the threshold value. This time, the volume change directions can be correctly detected. This is also true in the case where the first and second shut-off valves are closed upon termination of the suction stroke of the pump device in question, because the drive current change rate will necessarily exceed the predetermined threshold in the delivery stroke following the next suction stroke.

In the traction control operation, the volume change directions of the variable-volume chambers can be detected in the case where the first and second solenoid-operated shut-off valves of one of the two braking systems are closed upon initiation of the delivery stroke of the pump device of that braking system or within a predetermined time period shortly before or after that initiation. If the first and second shut-off valves are closed within the predetermined time period before the initiation of the delivery stroke, namely, during the latter half of the preceding suction stroke, a considerable amount of the brake fluid is sucked into the variable-volume chamber 76, 76A of the braking system in question, and the fluid remains in the chamber in a considerable amount within a predetermined time period before the initiation of the delivery stroke, namely, during the former half of the delivery stroke. When the fluid is delivery from the chamber while the first and second shut-off valves are closed, a considerable load acts on the pump drive motor 86, resulting in the drive current change rate exceeding the predetermined threshold value. If the shut-off valves are closed at a moment other than the moment of initiation of the delivery stroke and the predetermined time period shortly before or after the initiation, the load which acts on the pump drive motor 86 during the delivery stroke will not increase to such an extent that causes the drive current change rate to exceed the threshold value, resulting in a failure to correctly detect the volume change directions of the variable-volume chambers.

In the above embodiment, the detection of the volume change directions of the variable-volume chambers depends upon whether the drive current change rate exceeds the predetermined threshold value in the latter half of the operating period of the pump devices during which the first and second solenoid-operated shut-off valves are held closed in one of the two braking systems. The present braking apparatus may be provided with confirming means for confirming the correctness of the detection that the drive current change rate does not exceed the threshold value in the above-indicated latter half. The conforming means is operated in the next half of the operating period of the pump devices, that is, in the delivery stroke of the pump device of the other braking system in which the first and second shut-off valves were not closed. The confirming means determines whether the drive current change rate exceeds the threshold value in the delivery stroke of the pump device of the above-indicated other braking system. If an affirmative decision is obtained by this confirming means, it indicates that the above-indicated other braking system is now in the delivery stroke, and that the above-indicated one braking system is now in the suction stroke and was in the delivery stroke when the drive current change rate not exceeding the threshold value was detected in the last operating cycle. If a negative decision is obtained by the confirming means, it means that the drive current change rate exceeds the threshold value neither in the latter half of the operating period of the pump device of one of the two braking systems in which the first and second shut-off valves are closed, nor in the following half of the operating period of the pump device of the other braking system. In this case, there is a high possibility of some abnormality of the braking apparatus.

The braking apparatus according to the above embodiment may be provided with confirming means which is operated in the traction control operation with the first and second solenoid-operated shut-off valves of one of the two braking systems being held closed during the operating period or cycle time of the pump devices. If the drive current change rate exceeds the threshold in the former half of this period and does not exceed the threshold in the latter half, the confirming means determines that the pump device of the above-indicated one braking system was in the delivery stroke in the former half of the period while the pump device of the other braking system was in the delivery stroke in the latter half. If the drive current change rate exceeds in none of the former and latter halves, or exceeds in both of these two halves, there is a high possibility of some abnormality of the braking apparatus.

Suitable means may be provided for dealing with the above-indicated case of high possibility of some abnormality of the braking apparatus. This means may be operated in at least one of the anti-lock and traction control operations, for repeating the detection of the volume change directions of the variable-volume chambers 76, 76A (determination of the suction or delivery stroke each pump device 70, 70A), or providing an indication that there exists a high possibility of abnormality of the braking system.

Although the detection of the volume change directions of the variable-volume chambers is effected on the basis of the drive current of the pump drive motor 86 in the above embodiment, the detection may be effected on the basis of the directions of movement of the pump pistons 74, 74A, which may be detected on the basis of an output signal of a position detecting device for detecting the position of the pump pistons 74, 74A or the position of a suitable member which operates with the pump pistons such as the eccentric cam 82 or a component of the pump drive motor 86. The position detecting device may be a device for continuously detecting the position of the pump pistons 74, 74A, a device for detecting at least one of the delivery and suction stroke ends (fully advanced and retracted positions) of the pump pistons, or a device for detecting the zero or home position of the eccentric cam 82 or pump drive motor 86.

While the above embodiment is adapted to adjust the rates of increase and decrease of the wheel brake cylinder pressure by controlling the operating speed of the pump drive motor 86, the pressure increase and decrease rates may be adjusted otherwise. For instance, the pressure increase rate may be adjusted by controlling the duty ratio of the first and second solenoid-operated shut-off valves 46–50, 46A–50A to open and close these shut-off valves when the pressurized fluid is sucked from the master cylinder 12 into the pump device 70, 70A and/or when the pressurized fluid is delivered from the pump device into the wheel brake cylinder 22, 28, 36, 42. Similarly, the pressure decrease rate may be adjusted by controlling the duty ratio of the shut-off valves when the fluid is sucked from the wheel brake cylinder into the pump device and/or when the fluid is delivered from the pump device into the master cylinder 12.

Although the pump piston drive device 88 provided in the above embodiment includes the eccentric cam 82 and the springs 80, 80A, the pump piston drive device may have other arrangements. For instance, the pump piston drive device may use a cam other than an eccentric cam, such as a positive motion cam. Alternatively, the pump piston drive device may include a connecting device which includes a crank shaft and a connecting rod and which mechanically connects the pump drive motor 86 and the pump pistons 74, 74A.

In particular, the pump piston drive device may may use a positive motion cam or a connecting device as indicated above, so as to reciprocate the pump pistons in a predetermined positional relationship with the drive shaft of the pump drive motor, where the hydraulic operated braking apparatus is arranged such that the closure of the first and second solenoid-operated shut-off valves for the purpose of detecting the volume change directions of the variable-volume chambers 76, 76A in the anti-lock control operation inhibits the suction of the fluid into the pump device of the braking system in which the shut-off valves are closed.

In the above embodiment wherein the volume change directions of the variable-volume chambers 76, 76A are detected shortly before the anti-lock or traction control operations, the first and second solenoid-operated shut-off valves can be opened and closed in timed relationship with the suction and delivery strokes of the reciprocating pump device 70, 70A so as to suitably regulate the wheel cylinder pressure in the anti-lock or traction control mode without a delay immediately after the predetermined condition for initiating the anti-lock or traction control operation has been satisfied. However, the detection of the volume change directions of the variable-volume chambers may be effected when the predetermined condition for initiating the anti-lock or traction control operation is satisfied. In this case, the required overall operating time of the pump drive motor 86 can be reduced.

While the above embodiment uses only one first solenoid-operated shut-off valve 46 for both of the right and left wheel brake cylinders in each of the first and second braking systems, two first solenoid-operated shut-off valves may be provided for the respective two wheel brake cylinders in each braking system, like the two second solenoid-operated shut-off valves.

Referring next to FIGS. 8–11, a second embodiment of this invention will be described. In the present second embodiment, first and second shut-off valves of a hydraulic pressure control actuator are mechanically opened and closed in timed or synchronized relationship with the suction and delivery strokes of the reciprocating pump devices. In the second embodiment, the same reference numerals as used in the first embodiment will be used to identify the functionally corresponding elements, and redundant description of these elements will not be provided in the interest of simplification.

In the hydraulically operated braking apparatus according to the present second embodiment, one of the two pressurizing chambers of the master cylinder 12 is connected to the brake cylinder 22 of the front left wheel 20 through fluid passages 120, 122, and to the brake cylinder 28 of the rear right wheel 26 through fluid passages 120, 124. In the fluid passage 120, there are provided a first shut-off valve 128 and a second shut-off valve 130. In the fluid passages 122 and 124, there are respectively provided two solenoid-operated directional control valves 132, 134. Since the first and second shut-off valves 128, 130 have the same construction, only the first shut-off valve 128 will be described by way of example by reference to FIG. 9.

The first shut-off valve 128 has a valve housing 140 in which is fluid-tightly and slidably received a control piston 142 such that one end portion of the control piston 142 projects out of the valve housing 140. The other end portion of the control piston 142 cooperates with the valve housing 140 to define a valve chamber 144 which communicates with the second shut-off valve 130 via a port 146 and with the master cylinder 12 via a port 148. A valve seat 150 is formed around the inner open end of the port 146 and partially defines the valve chamber 144.

The valve chamber 144 of the second shut-off valve 144 which has the same construction as the first shut-off valve 128 communicates with the first shut-off valve 128 via the port 148 and with the front left wheel brake cylinder 22 via the port 146.

A valve member in the form of a ball 152 is disposed within the valve chamber 144. The ball 152 has an integrally formed engaging projection 154. A cylindrical holder member 156 is axially movably received in the valve chamber 144, and the engaging projection 154 engages this holder member 156 such that the engaging projection 154 is movable in the axial direction of the holder member 156. The ball 152 is biased by a spring 158 disposed between the ball 152 and the holder member 156, in a direction away from the holder member 156. The spring 158 serves as biasing means in the form of an elastic member. The engaging projection 154 has a head portion 160 located within a cylindrical portion of the holder member 156, so that abutting contact of the head portion 160 with the holder member 156 limits a maximum axial distance between the ball 152 and the holder member 156. A biasing force of the spring 158 is determined so that the ball 150 seated on the valve seat 150 is prevented from being moved away from the valve seat 150 when the ordinary delivery pressure of a reciprocating pump device 170 or the pressure of the wheel brake cylinder 22, 28 is applied to the port 146. The holder member 156 is biased by a spring 162 disposed within the valve chamber 144, and is held in contact with the control piston 142 so that the holder member 156 is moved with the control piston 142. The spring 162 serves another biasing means in the form of an elastic member.

The solenoid-operated directional control valves 132, 134 are connected to the appropriate pressurizing chamber of the master cylinder 12 through fluid passages 164, 166, 168. Each of these directional control valves 132, 134 has a master cylinder position for fluid communication of between the wheel brake cylinder 22, 28 with the master cylinder 12, and a pump position for fluid communication of the wheel brake cylinder 22, 28 with a reciprocating pump device 170 which will be described. When the directional control valve 132 is placed in the master cylinder position, for example, the fluid delivered from the pump device 170 cannot be supplied to the wheel brake cylinder 22. In this case, the ball 152 is moved away from the valve seat 150 to permit the fluid delivered from the pump device 170 to be returned to the master cylinder 12 through the first shut-off valve 128. The biasing force of the spring 158 is determined to permit the ball 152 to be moved away from the valve seat 150 when the directional control valve 132 is placed in the master cylinder position during the delivery stroke of the pump device 170. It will be understood that the first shut-off valve 128 also functions as a pressure-relief valve.

The reciprocating pump device 170 is connected through a pump passage 172 to a portion of the fluid passage 120 between the first and second shut-off valves 128, 130. The pump device 170 is identical in construction with the pump device 70 used in the first embodiment. The piston 74 is held in contact with the eccentric cam 82, and the control pistons 142 of the first and second shut-off valves 128, 130 are held in contact with the eccentric cam 82 such that the points of contact of the two control pistons 142 with the circumferential surface of the eccentric cam 82 are spaced apart from the point of contact of the pump piston 74 with the same by 90° in the opposite circumferential directions of the eccentric cam 82. The biasing force of the spring 162 biasing the holder member 156 against the end face of each control piston 142 acts on the control piston 142 so as to hold the control piston in contact with the eccentric cam 82.

In the pump passage 172, there is provided a flow restrictor 190 for restricting flows of the fluid through the pump passage 172 or applying a resistance to flows of the fluid through the pump passage 172. A reservoir passage 192 is connected at one end thereof to a portion of the pump passage 172 between the flow restrictor 190 and the first and second shut-off valves 128, 130, and at the other end to a reservoir 194. A third shut-off valve in the form of a pilot-operated shut-off valve 196 is provided in the reservoir passage 192. The shut-off valve 196 is connected through a fluid passage 198 to a portion of the pump passage 172 between the flow restrictor 190 and the pump device 170, and connected through a fluid passage 200 to the portion of the pump passage 172 between the flow restrictor 180 and the first and second shut-off valves 128, 130. Pilot pressures applied to the pilot-operated shut-off valve 196 through the fluid passages 198, 200 act in the opposite directions, so that the shut-off valve 195 is normally closed, and is opened for fluid communication of the pump passage 172 with the reservoir 194 through the reservoir passage 192 when the pilot pressure applied through the passage 198 becomes lower than the pilot pressure applied through the passage 200 by more than a predetermined valve opening pressure difference value. The flow restrictor 190, reservoir passage 192, reservoir 194 and fluid passages 198, 200 constitute a rapidly pressure reducing device 202. The reservoir 194 is connected to the fluid passage 168 through a by-pass passage 205 provided with a check valve 204.

The second braking system is provided with the same hydraulic pressure control actuator as described above with respect to the first braking system including the pump device 170. The hydraulic pressure control actuator of the second braking system includes a reciprocating pump device 170A which utilizes the same pump drive device 89 as used for the pump device 170A. The control pistons 142A of the first and second shut-off valves 128A, 130A are held in contact with the eccentric cam 82. The eccentric cam 82 has an axial length large enough to permit the contact of the control pistons 142 and 142A with the eccentric cam 82 such that the points of contact of the control pistons 142A with the eccentric cam 82 are spaced from those of the control pistons 142 in the axial direction of the eccentric cam 82. In the circumferential direction of the eccentric cam 82, the second shut-off valve 130A is located at the same position as the first shut-off valve 128, while the first shut-off valve 128A is located at the same position as the second shut-off valve 130.

The solenoid-operated directional control valves 132, 134, 132A, 134A and the pump drive motor 86 are controlled by an electronic control unit 210, so as to regulate the wheel brake cylinder pressures in the anti-lock and traction control modes.

An operation of the first braking system of the braking apparatus of FIG. 8 will be described by way of example.

Figure 8:
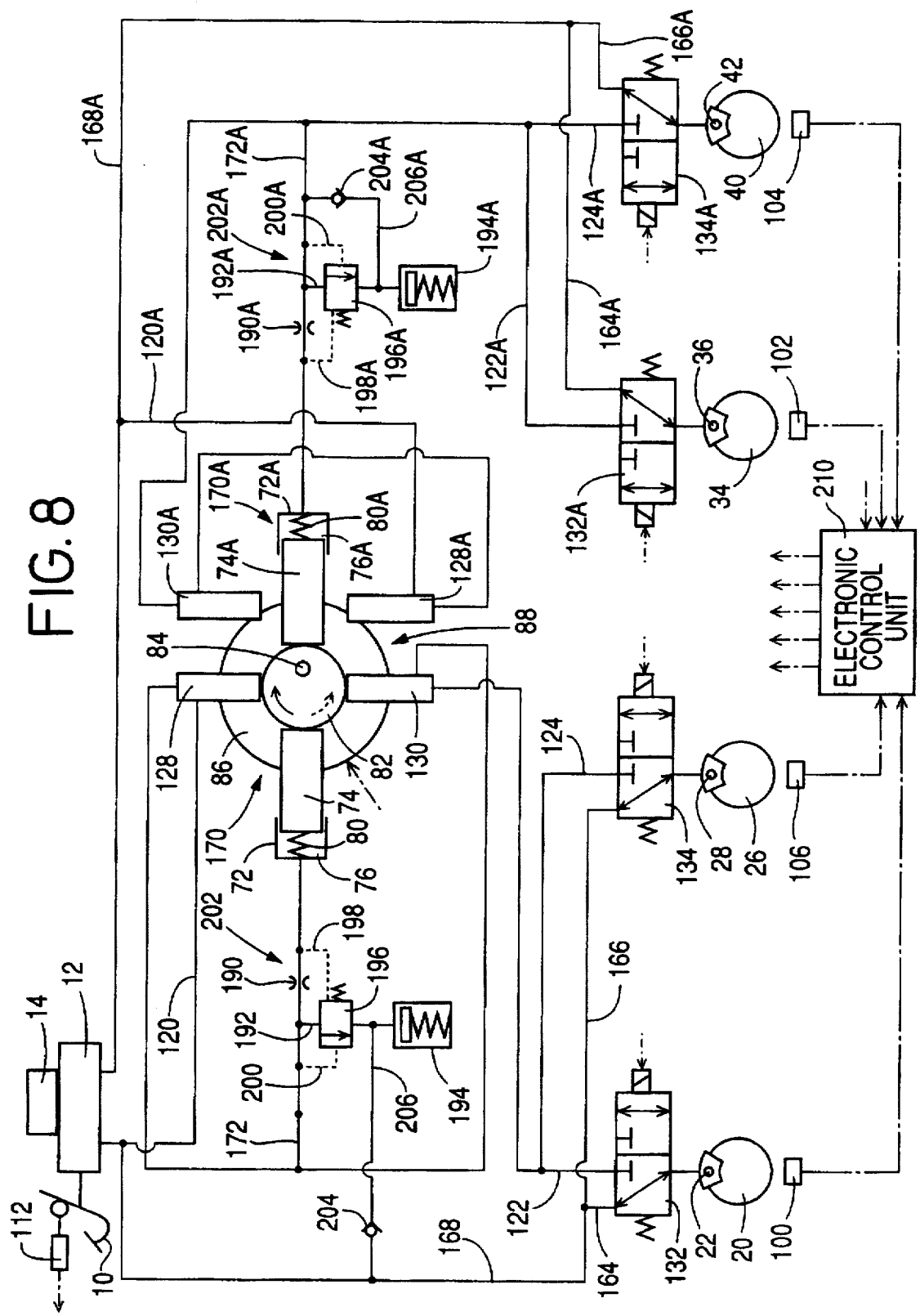
FIG. 8 is a schematic view illustrating a hydraulically operated braking apparatus equipped with another embodiment of the hydraulic braking pressure control device of this invention.
Figure 9:
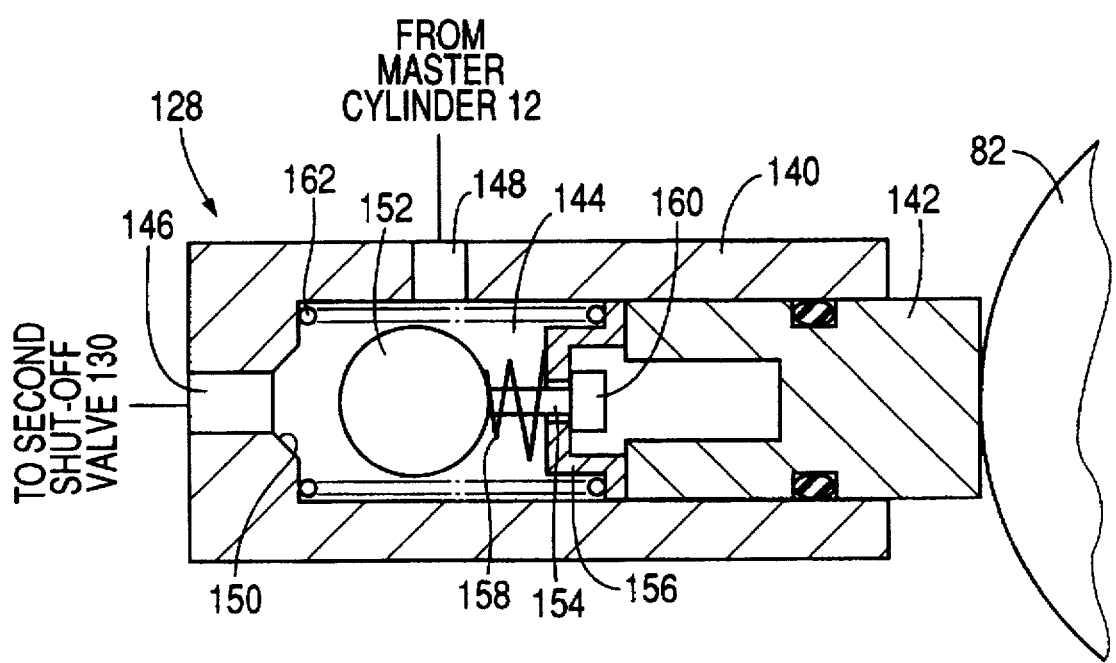
FIG. 9 is a front elevational view in cross section showing a first shut-off valve used in the braking pressure control device of FIG. 8.

When the brake pedal 10 is in a non-operated state, the first and second solenoid-operated directional control valves 132, 134 are placed in the states of FIG. 8, and the wheel brake cylinders 22, 28 are held in communication with the master cylinder 12. When the brake pedal 10 is depressed in this condition, the fluid pressure generated in the appropriate pressurizing chamber of the master cylinder 12 is applied to the wheel brake cylinders 22, 28 for braking the front left and right wheels 20, 34. Since one of the first and second shut-off valves 128, 130 is open while the other shut-off valve 128, 130 is closed, the fluid is inhibited to flow through the fluid passage 120.

When the depression force acting on the brake pedal 10 is excessively large with respect to the friction coefficient of the road surface on which the vehicle is running, the slip of one or both of the wheels 20, 26 exceeds the upper limit of an optimum range, and the hydraulic braking pressure control device is operated in the anti-lock control mode with the pump drive motor 86 being operated so as to rotate the eccentric cam 82 in the clockwise direction as indicated by solid line arrow in FIG. 8. As a result, the pump piston 74 is reciprocated by the eccentric cam 82, so as to suck the brake fluid into the variable-volume fluid chamber 75 during the suction stroke and delivery the fluid from the chamber 76 during the delivery stroke. At the same time, the control pistons 142 of the first and second shut-off valves 128, 130 are reciprocated (advanced and retracted), whereby these shut-off valves are alternately opened and closed.

As the distance between the rotation axis of the eccentric cam 82 and the point of contact of the control piston 142 of the first shut-off valve 128 with the eccentric cam 82 increases, the control piston 142 is advanced, eventually bringing the ball 152 into contact with the valve seat 150. After the ball 150 is seated on the valve seat 152, the control piston 142 is further advanced with the spring 158 being compressed, whereby the first shut-off valve 128 is held closed. As the distance between the rotation axis of the eccentric cam 82 and the point of contact of the control piston 142 with the eccentric cam 82 decreases, the control piston 142 is retracted, so that the spring 152 is initially expanded, and then the ball 152 is moved away from the valve seat 150, whereby the first shut-off valve is opened. Since the control pistons 142 of the first and second shut-off valves 128, 130 are in contact with the eccentric cam 82 at the circumferential positions of the latter which are 180° spaced apart from each other, the first shut-off valve 128 is opened and closed while the second shut-off valve 130 is closed and opened, respectively.

Figure 10:
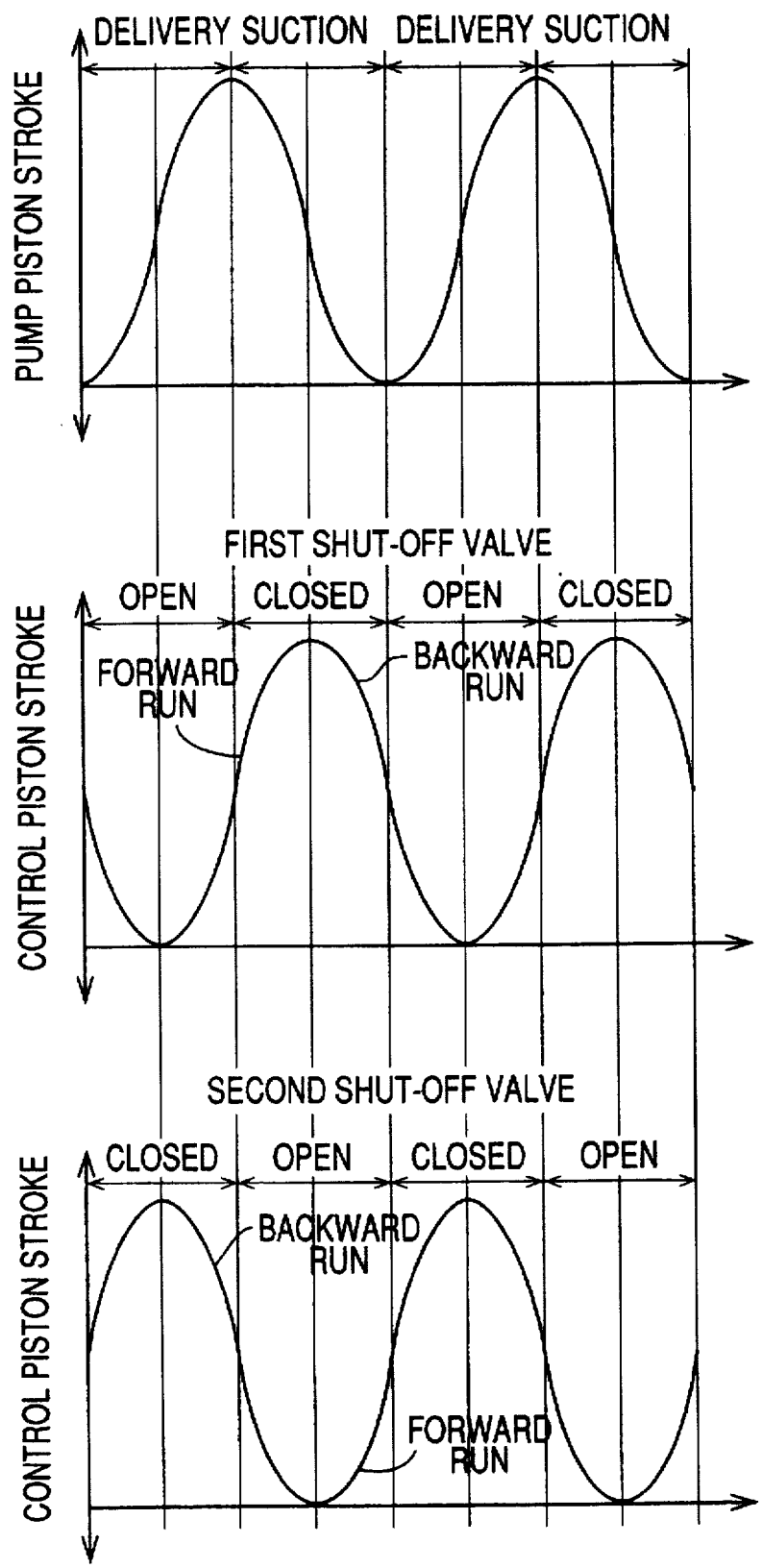
FIG. 10 is a timing chart showing the suction and delivery strokes of a reciprocating pump device and the opening and closing periods of first and second shut-off valves in an anti-lock control mode in the braking pressure control device of FIG. 8.

With the eccentric cam 82 rotated in the clockwise direction, the first shut-off valve 128 is closed while the second shut-off valve 130 is opened during the pump device 170 is in the suction stroke, as indicated in FIG. 10, whereby the brake fluid is sucked from the wheel brake cylinder 22, 28 into the pump device 170 through the open second shut-off valve 130. During the delivery stroke of the pump device 170, the first shut-off valve 128 is opened while the second shut-off valve 130 is closed, as also indicated in FIG. 10, whereby the brake fluid is delivered from the pump device 170 to the master cylinder 12 through the open first shut-off valve 128.

In the anti-lock control operation, the pump device 170 is operated with continuous rotation of the eccentric cam 82 in the clockwise direction only, so that the first and second shut-off valves 128, 130 are opened and closed so as to reduce the pressure in the wheel brake cylinder 22, for example. In this condition, the solenoid-operated directional control valve 132 is switched between the master cylinder position and the pump position, to increase, decrease and hold the pressure in the wheel brake cylinder 22.

If the slip amount of the front left wheel 20 is excessively large and the anti-lock control operation is effected for the corresponding wheel brake cylinder 22, the solenoid-operated directional control valve 132 is placed in the pump position so that the fluid is sucked from the wheel brake cylinder 22 into the pump device 170, to decrease the pressure in the wheel brake cylinder 22. Since the flow of the brake fluid into the variable-volume chamber 76 is restricted by the flow restrictor 190, the pressure in the fluid passage 198 becomes lower than the pressure in the fluid passage 200 by more than the predetermined difference value, so that the pilot-operated shut-off valve 196 is opened permitting the fluid to flow from the wheel brake cylinder 22 toward the reservoir 194, whereby the pressure in the wheel brake cylinder 22 is rapidly reduced.

When the slipping tendency of the front left wheel 20 is reduced, the solenoid-operated directional control valve 132 is switched to the master cylinder position for fluid communication of the wheel brake cylinder 22 with the master cylinder 12, whereby the pressure in the wheel brake cylinder 22 is increased. If the wheel brake cylinder 22 is held in communication with the master cylinder 12, the rate of increase of the pressure in the cylinder 22 may be excessive. To avoid this, the directional control valve 132 is alternately placed in the master cylinder position and the pump position, so as to increase the wheel cylinder pressure at an optimum rate.

As long as the pump device 170 is in the delivery stroke, the second shut-off valve 130 remains closed preventing the brake fluid to be discharged from the wheel brake cylinder 22, even if the wheel brake cylinder 22 is in communication with the pump device 170 with the directional control valve 132 switched to the pump position. During this delivery stroke, therefore, the wheel brake cylinder pressure is not reduced. To increase the pressure in the wheel brake cylinder 22 at an optimum rate, the duty ratio of the solenoid-operated shut-off valve 132 is suitably determined to control the ratio of the time during which the valve 132 is placed in the master cylinder position, to the time during which the valve 132 is placed in the pump position. In this respect, the duty ratio should be determined by considering the fact that the brake fluid is not discharged from the wheel brake cylinder 22 in a half of the time during which the directional control valve 132 is placed in the pump position.

In the anti-lock control operation, the operating speed of the pump drive motor 86 is determined so that the rate of decrease of the wheel cylinder pressure is controlled to a desired value while the directional control valve 132 is held in the pump position. The thus determined operating speed of the pump drive motor 86 should also be considered as a prerequisite, in determining the duty ratio of the shut-off valve 132 so as to obtain the desired rate of increase of the wheel brake cylinder pressure.

To hold the pressure in the wheel brake cylinder 22, too, the the duty ratio of the solenoid-operated shut-off valve 132 should be suitably determined, by considering the fact that the brake fluid is not discharged from the wheel brake cylinder 22 in a half of the time during which the directional control valve 132 is placed in the pump position.

It will be understood that the rate of increase of the wheel brake cylinder pressure can be changed as desired, by changing the duty ratio of the solenoid-operated directional control valve 132, namely, by changing the ratio of the times during which the valve 132 is alternately placed in the master cylinder position and the pump position. The wheel brake cylinder pressure can be held by zeroing the rate of increase of the wheel brake cylinder pressure.

It will also be understood that the pressures in the wheel brake cylinders 22, 28 can be controlled (increased, decreased and held) independently of each other, by controlling the solenoid-operated directional control valves 132, 134 independently of each other depending upon the slip ratios of the front left wheel 20 and the rear right wheel 26.

When the brake pedal 10 is moved toward its non-operated position during the pressure increase or hold of the wheel brake cylinder 22, the brake fluid is returned from the wheel brake cylinder 22 back to the pressurizing chamber of the master cylinder 12 through the fluid passage 164 when the directional control valve 132 is placed in the master cylinder position. Consequently, the wheel brake cylinder pressure is reduced.

When the anti-lock control mode is cancelled, the directional control valve 132 is switched to the master cylinder position. If the anti-lock control mode is cancelled by releasing the brake pedal 10, the brake fluid is returned from the wheel brake cylinder 22 to the master cylinder 12 through the fluid passages 164, 168. The fluid in the reservoir 194 is returned to the master cylinder 12 through the check valve 202, pump passage 172 and fluid passage 168.

In the second braking system, the pump piston 75A of the reciprocating pump device 170A has an operating phase which is different from that of the pump piston 76 of the pump device 170, by an amount corresponding to 180° rotation of the eccentric cam 82. Similarly, the operating phases of the first and second shut-off valves 128A, 130A of the second braking system are 180° different from those of the first and second shut-off valves 128, 130 of the first braking system. In other words, the suction and delivery strokes of the pump device 170A take place during the delivery and suction strokes of the pump device 170, and the first and second shut-off valves 128A, 130A are opened and closed while the first and second shut-off valves 128, 130 are closed and opened, respectively. When the eccentric cam 82 is rotated in the clockwise direction, the pump device 170A and the first and second shut-off valves 128A, 130A are operated so as to reduce the wheel cylinder pressure. The slip ratios of the front right wheel 34 and the rear left wheel 40 can be controlled to within an optimum range by switching the directional control valves 132A, 134A between the master cylinder position and the pump position, as described above with respect to the first braking system.

Where the anti-lock control operations are initiated at different times in the first and second braking systems, a rotary motion of the eccentric cam 82 to effect the anti-lock control operation in only one of the two braking systems will not cause pressure decrease of the wheel brake cylinders in the other braking system, since the two solenoid-operated directional control valves in the above-indicated other braking system are both placed in the master cylinder position. Thus, the braking apparatus provides a sufficiently large overall braking force.

To effect the traction control operation, the pump drive motor 86 is activated to rotate the eccentric cam 82 in the counterclockwise direction as indicated by broken line arrow in FIG. 8, namely, in the direction opposite to that in the anti-lock control operation. As a result, the first and second shut-off valves 128 and 130 are opened and closed, respectively, during the delivery stroke of the pump device 170, so that the brake fluid is sucked from the master cylinder 12 into the pump device 170. During the following delivery stroke of the pump device 170, the first and second shut-off valves 128, 130 are closed and opened, respectively, so that the brake fluid is delivered from the pump device 170 to the front left wheel brake cylinder 22.

During the traction control operation, the pump device 170 is operated with the eccentric cam 82 kept rotated in the counterclockwise direction only, and the first and second shut-off valves 128, 130 are opened and closed so as to increase the pressure in the wheel brake cylinder 22. When the solenoid-operated directional control valve 132 is switched to the master cylinder position, the brake fluid is discharged from the wheel brake cylinder 22 to the master cylinder 12, whereby the pressure in the wheel brake cylinder 22 is reduced.

Since the rear right and left wheels 40, 26 are non-drive or idler wheels, the pressures in the corresponding wheel brake cylinders 28, 42 are not increased with the solenoid-operated directional control valves 134, 134A being held in the master cylinder position.

Described in detail, if the traction control operation is effected when the slip amount of the front left drive wheel 20 is excessive, the directional control valve 132 is switched to the pump position so that the brake fluid sucked from the master cylinder 12 into the pump device 170 is delivered to the wheel brake cylinder 22, for braking the front left wheel 20. When the excessive slipping tendency of the front left wheel 20 is eliminated, the directional control valve 132 is switched to the master cylinder position. Since the master cylinder pressure is zero during the traction control operation with the brake pedal 12 placed at its non-operated position, the brake fluid is discharged from the wheel brake cylinder 22 to the corresponding pressurizing chamber of the master cylinder 12 through the directional control valve 132, whereby the pressure in the wheel brake cylinder 22 is reduced.

The pressure in the wheel brake cylinder 22 may be maintained by alternately placing the directional control valve 132 in the master cylinder position and the pump position, so that the brake fluid supplied from the pump device 170 to the wheel brake cylinder 22 when the valve 132 is in the pump position is returned to the master cylinder 12 when the valve 132 is placed in the master cylinder position. If the duty ratio of the solenoid-operated directional control valve 132 is controlled so as to place the valve 132 in the master cylinder position for a time longer than that for which the valve 132 is placed in the pump position, the pressure in the wheel brake cylinder 22 is reduced. In this respect, it is noted that the brake fluid is not supplied to the wheel brake cylinder 22 in a half of the period during which the valve 132 is placed in the pump position, namely, during the suction stroke of the pump device 170. This fact should be taken into account in determining the duty ratio of the directional control valve 132.

In the traction control operation, the operating speed of the pump drive motor 86 is determined so as to increase the wheel brake cylinder pressure at a desired rate with the directional control valve 132 placed in the pump position. The thus determined operating speed of the pump drive motor 86 is a prerequisite in determining the duty ratio (energization current) of the solenoid-operated directional control valve 132 so as to obtain a desired rate of decrease of the wheel brake cylinder pressure or to hold the wheel brake cylinder pressure.

It will be understood from the above explanation of this second embodiment that the eccentric cam 82 functions as a movable member of the pump piston drive device 88, while the control pistons 142, 142A function as movable members of the first and second shut-off valves 128, 128A, 130, 130A, and that the eccentric cam 82 and the control pistons 142, 142A which contact each other and which are both solid members constitute a motion transmitting device of solid member type which functions as synchronizing means for synchronizing the opening and closing actions of the first and second shut-off valves 128, 128A, 130, 130A with the suction and delivery strokes of the reciprocating pump devices 170, 170A.

Referring next to FIGS. 12–18, there will be described a hydraulically operated braking apparatus constructed according to a third embodiment of the present invention. In this braking apparatus, too, the first braking system including the front left and rear right wheel brake cylinders and the second braking system including the front right and rear left wheel brake cylinders are identical in construction with each other. Hence, only the first braking system is illustrated and will be described by way of example.

Figure 12:
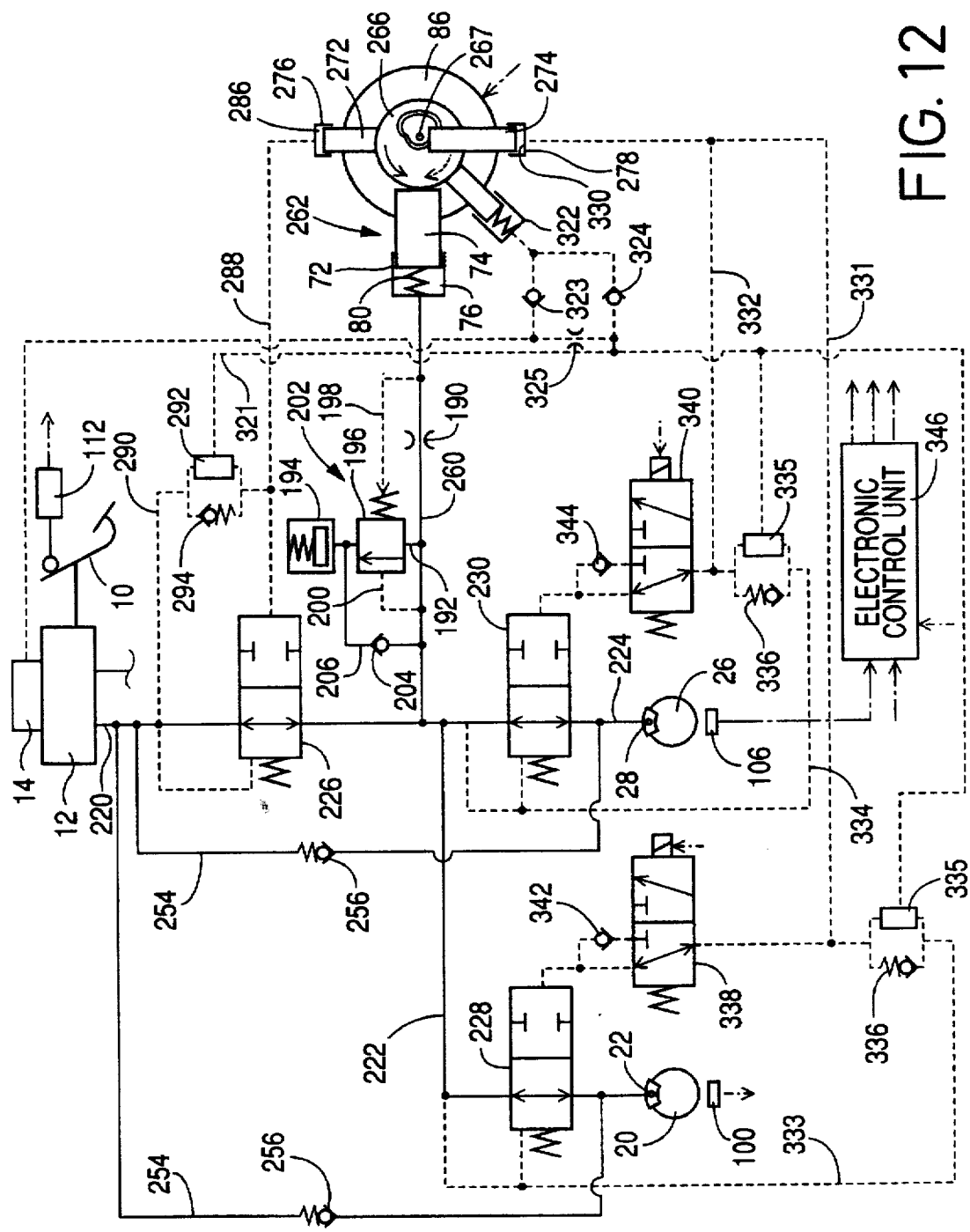
FIG. 12 is a schematic view illustrating a hydraulically operated braking apparatus equipped with a further embodiment of the hydraulic braking pressure control device of this invention.

As shown in FIG. 12, one of the two pressurizing chambers of the master cylinder 12 is connected to the brake cylinder 22 of the front left wheel 20 through fluid passages 220, 222, and to the brake cylinder 28 of the rear right wheel 26 through fluid passages 220, 224. A first shut-off valve 226 is provided in the fluid passage 220, and two second shut-off valves 228, 230 are provided in the fluid passages 222, 224, respectively. These first and second shut-off valves 226, 228, 230 have the same construction, and the first shut-off valve 226 will be explained by way of example by reference to FIG. 13.

Figure 13:
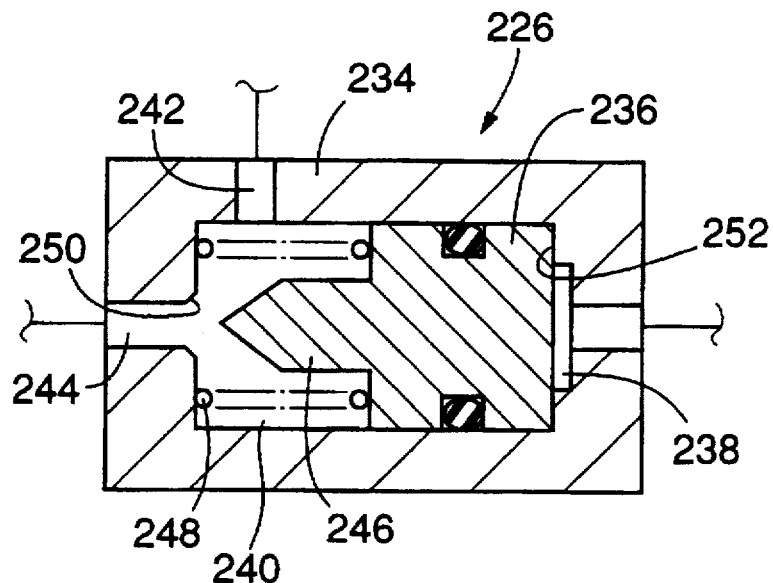
FIG. 13 is a front elevational view in cross section of a first shut-off valve which is an element of the braking pressure control device of FIG. 12.

As shown in FIG. 13, the first shut-off valve 226 has a valve housing 234 in which is fluid-tightly and slidably received a control piston 236. The control piston 236 cooperates with the valve housing 234 to define an operating pressure chamber 238 on one side of the control piston 236, and a valve chamber 240 on the other side of the control piston 236. The valve chamber 240 communicates with the master cylinder 12 through a port 242, and with a port 242 of each of the second shut-off valves 228, 230 through a port 244. Each second shut-off valve 228, 230 has a port 244 communicating with the corresponding wheel brake cylinder 22, 28.

The control piston 236 has a valve member 246 integrally formed on one of its opposite end faces which partially defines the valve chamber 240. The control piston 236 is biased by a spring 248 disposed in the valve chamber 240, in a direction away from a valve seat 250 which is formed around an inner open end of the port 244. Under the biasing force of the spring 248, the control piston 236 is normally held at its fully retracted position with the other end face in abutting contact with a stop surface 252 provided on the valve housing 234. Thus, the first shut-off valve 226 is normally open with the valve member 246 held apart from the valve seat 250.

The wheel brake cylinders 22, 28 are connected to the master cylinder 12 by respective two by-pass passages 254 which by-pass the respective first and second shut-off valves 226, 228, 230. In each of these by-pass passages 254, there is provided a pressure relief valve 256 whose relief pressure is set at about 7.8 MPa (80 kg·f/cm²). This pressure relief valve 256 permits a flow of the brake fluid in a first direction from the wheel brake cylinder 22, 28 toward the master cylinder 12 when the pressure difference across the valve 256 exceeds the relief pressure, and inhibits a flow of the brake fluid in a second direction opposite to the first direction.

A reciprocating pump device 262 is connected through a pump passage 260 to a portion of the fluid passage 220 between the first shut-off valve 226 and the second shut-off valves 22, 230. The pump device 262, which has the same construction as the pump device 70 of the first embodiment, includes a disk-like eccentric cam 266 similar to the eccentric cam 82, a rotary shaft 267 for rotating the eccentric cam 266, and a pump piston 74 held in contact with a circumferential cam surface of the eccentric cam 266. The rotary shaft 267 supports the eccentric cam 266 such that the axis of the rotary shaft 267 is offset from the center of the eccentric cam 266. As in the second embodiment of FIG. 8, the rapidly pressure reducing device 202 is provided in the pump passage 260.

Figure 15:
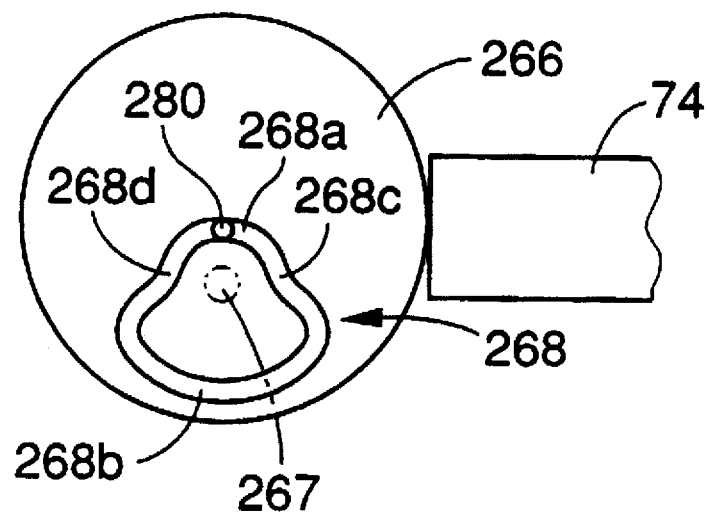
FIG. 15 is a view showing an eccentric cam which has a cam groove for controlling the second shut-off valve and which is provided in a reciprocating pump device which is an element of the braking pressure control device of FIG. 12.
Figure 16:
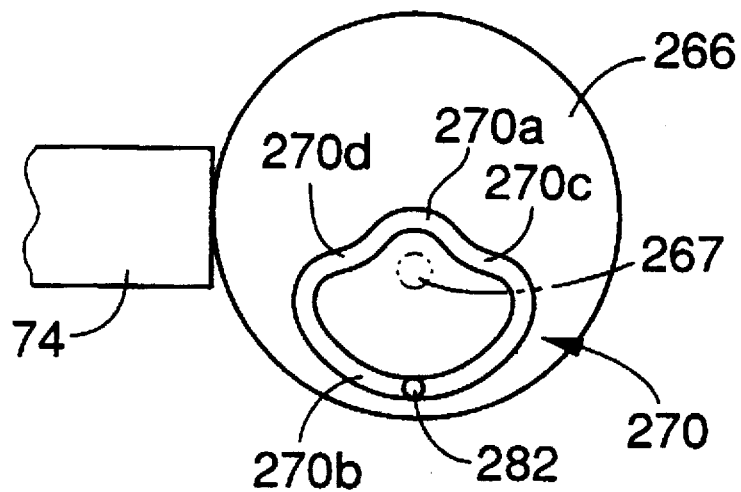
FIG. 16 is view showing another cam groove which is formed in the eccentric cam of FIG. 15 for controlling a second shut-off valve.

The eccentric cam 266 has two cam grooves 268, 270 formed in the respective opposite end faces, as shown in FIGS. 15 and 16. First and second operating pistons 272 engage these two cam grooves 268, 270, respectively. The first and second operating pistons 272, 274 are fluid-tightly and slidably supported by respective cylinder housings 276, 278, such that one end portion of each piston 272, 274 protrudes out of the corresponding cylinder housing 276, 278, for engagement with the corresponding cam groove 268, 270 through an engaging projection 280, 282.

As shown in FIG. 15, the cam groove 268 has two circular arc portions 268a, 268b which have an arc center on the axis of the rotary shaft 267 and different radii. The cam groove 268 also has two curved portions 268c, 268d which connect the two circular arc portions 268a, 268b. The curved portions 268c, 268d are formed such that a distance of the curved portions from the axis of the rotary shaft 267 gradually changes. As the engaging projection 280 is moved through the curved portions 268c, 268d, the first operating piston 272 is advanced and retracted so that the volume of a variable-volume chamber 286 defined between the piston 272 and the cylinder housing 276 is increased and decreased.

The variable-volume chamber 286 is connected through a fluid passage 288 to the operating pressure chamber 230 of the first shut-off valve 226. The fluid passage 288 is connected through a fluid passage 290 to the pressurizing chamber of the master cylinder 12. In the fluid passage 290, there are provided a controllable check valve 292 and a check valve 294 in parallel connection with each other. These two check valves 292, 294 permit flows of the brake fluid therethrough in opposite directions. Namely, the check valve 292 permits a flow of the fluid in a first direction from the fluid passage 288 toward the master cylinder 12, while the check valve 294 permits a flow of the fluid in a second direction opposite to the first direction. The controllable check valve 292 has an operating state in which the check valve 292 is enabled to perform a function of inhibiting a flow of the fluid in the second direction, and a non-operating state in which the check valve 292 is disabled to perform the fluid flow inhibiting function. The check valve 294 is opened to permit the fluid flow in the second direction when the pressure difference across the check valve 294 exceeds a value which is set to be considerably large.

Figure 14:
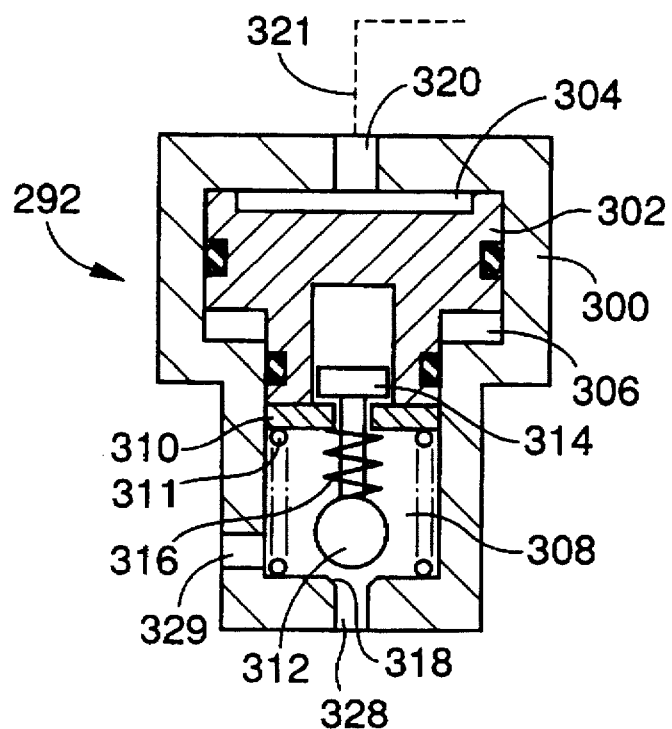
FIG. 14 is a front elevational view in cross section of a controllable check valve which is another element of the braking pressure control device of FIG. 12.

The controllable check shown in is constructed as shown in FIG. 14. This check valve 292 has a housing 300 in which is fluid-tightly and slidably received a stepped control piston 302. The housing 300 and the control piston 302 cooperate to define an operating pressure chamber 304, an atmospheric pressure chamber 306, and a valve chamber 308. The control piston 302 is biased in a direction toward its fully retracted position of FIG. 14, under a biasing force of a spring 311 which acts on the control piston 302 via a cylindrical holder member 310. The operating pressure chamber 304 has a cross sectional area which is sufficiently larger than that of the valve chamber 308, so that a comparatively low pressure applied to the operating pressure chamber 304 advances the control piston 302 to its fully advanced position, irrespective of the pressure in the valve chamber 308. The cylindrical holder member 310 supports a valve member 312 such that an engaging projection 314 of the valve member 312 is movable relative to the holder member 310 in the axial direction of the holder member 310. The valve member 312 is biased by a spring 316 in a direction away from the control piston 302. A distance of the valve member 312 and the control piston 302 in the axial direction of the control piston 302 is limited by abutting contact of the engaging projection 314 and the holder member 310.

With an advancing movement of the control piston 302, the valve member 312 is seated on a valve seat 318 before the control piston 302 reaches its fully advanced position. As the control piston 302 is further advanced to its fully advanced position, the spring 316 is compressed. This spring 315 is pre-loaded so that an amount of change of the biasing force of the spring 316 due to its compression is relatively small.

The operating pressure chamber 304 communicates with a small pump 322 through a port 320 and a fluid passage 321. The small pump 322 is a reciprocating pump device of small delivery capacity, which is also driven by the eccentric cam 266. When the small pump 322 is operated by either clockwise or counterclockwise rotation of the eccentric cam 266, the brake fluid is sucked from the reservoir 14 through a suction valve 323, and delivered to the fluid passage 321 through a delivery valve 324. A downstream side of the delivery valve 324 and an upstream side of the suction valve 323 are connected to each other through a fluid passage provided with a flow restrictor 325.

The brake fluid is delivered to the fluid passage 321 during the delivery stroke of the small pump 322. A relatively small portion of the delivered fluid is returned to the reservoir 14 through the flow restrictor 325, and the relatively large remaining portion is supplied to the operating pressure chamber 304 of the controllable check valve 292, whereby the control piston 302 is advanced. During the suction stroke of the small pump 322, the brake fluid is sucked into the small pump 322 from the reservoir 14 through the suction valve 323, and from the operating pressure chamber 304 through the flow restrictor 325 and the suction valve 323. However, the amount of the fluid discharged from the operating pressure chamber 304 during the suction stroke of the small pump 322 is smaller than the amount of the fluid delivered to the same chamber 304 during the delivery stroke of the small pump 322, so that the control piston 302 is moved to its fully advanced position to force the valve member 312 on the valve seat 318 after several reciprocations of the small pump 322.

The valve seat 318 is formed around an inner open end of a port 328 through which the valve chamber 308 communicates with a portion of the fluid passage 290 on the side of the fluid passage 288. When the valve member 312 is seated on the valve seat 318, the port 328 is disconnected from a port 328 through which the valve chamber 308 communicates with a portion of the fluid passage 290 on the side of the master cylinder 12. The valve member 312, valve seat 318 and spring 316 constitute a check valve adapted to permit a flow of the brake fluid in the above-indicated first direction from the fluid passage 288 toward the master cylinder 12 and inhibit a flow of the fluid in the opposite, second direction, while the control piston 302 is located at or near its fully advanced position. As indicated above, the spring 316 is pre-loaded, so that the pressure in the fluid passage 288 that causes the controllable check valve 292 to be opened is sufficient for advancing the control piston 236 of the first shut-off valve 226 against the biasing force of the spring 248.

When the engaging projection 280 of the first operating piston 272 is moved from the smaller-radius circular arc portion 268a to the larger-radius circular arc portion 268b through the curved portion 268c or 268d, during rotation of the eccentric cam 266, the first operating piston 272 is advanced with the engaging projection 280 being pushed by the curved portion 258c, 268d, and the brake fluid is delivered from the variable-volume chamber 286 to the operating pressure chamber 238 of the first shut-off valve 226, so that the control piston 236 is advanced to force the valve member 245 onto the valve seat 250, whereby the first shut-off valve 226 is closed. At this time, the control piston 236 receives the master cylinder pressure applied to the valve chamber 240, but the pressure applied to the operating pressure chamber 238 due to the advancing movement of the first operating piston 272 is higher than the master cylinder pressure by an amount equal to the opening pressure of the controllable check valve 292, so that the control piston 236 is advanced against the biasing force of the spring 248. The curved portion 268c is formed so as to advance the first operating piston 272 by a small distance after the closure of the first shut-off valve 226, to assure stable seating of the valve member 246 on the valve seat 250. This advancing movement is permitted by a discharge flow of the brake fluid through the controllable check valve 292 toward the master cylinder 12.

While the engaging projection 280 of the first operating piston 272 is moved through the larger-radius circular arc portion 268b, the first shut-off valve 226 is held closed. As the engaging projection 280 is moved to the smaller-radius circular arc portion 280a through the curved portion 268c or 268d, the first operating piston 272 is retracted. As a result, the brake fluid is discharged from the operating pressure chamber 238 into the variable-volume chamber 286, so that the control piston 236 is retracted, with the valve member 246 being moved away from the valve seat 250, whereby the first shut-off valve 226 is opened. The valve opening pressure of the check valve 294 is determined to be high enough to prevent a flow of the brake fluid in a direction from the master cylinder 12 toward the fluid passage 288 before the control piston 236 is brought into abutting contact with the stop surface 252. The curved portions 268c, 268d are formed so as to retract the first operating piston 272 by a small distance after the abutting contact of the control piston 236 with the stop surface 242. This retracting movement is permitted by a flow of the brake fluid through the check valve 294 toward the chamber 286.

Figure 17:
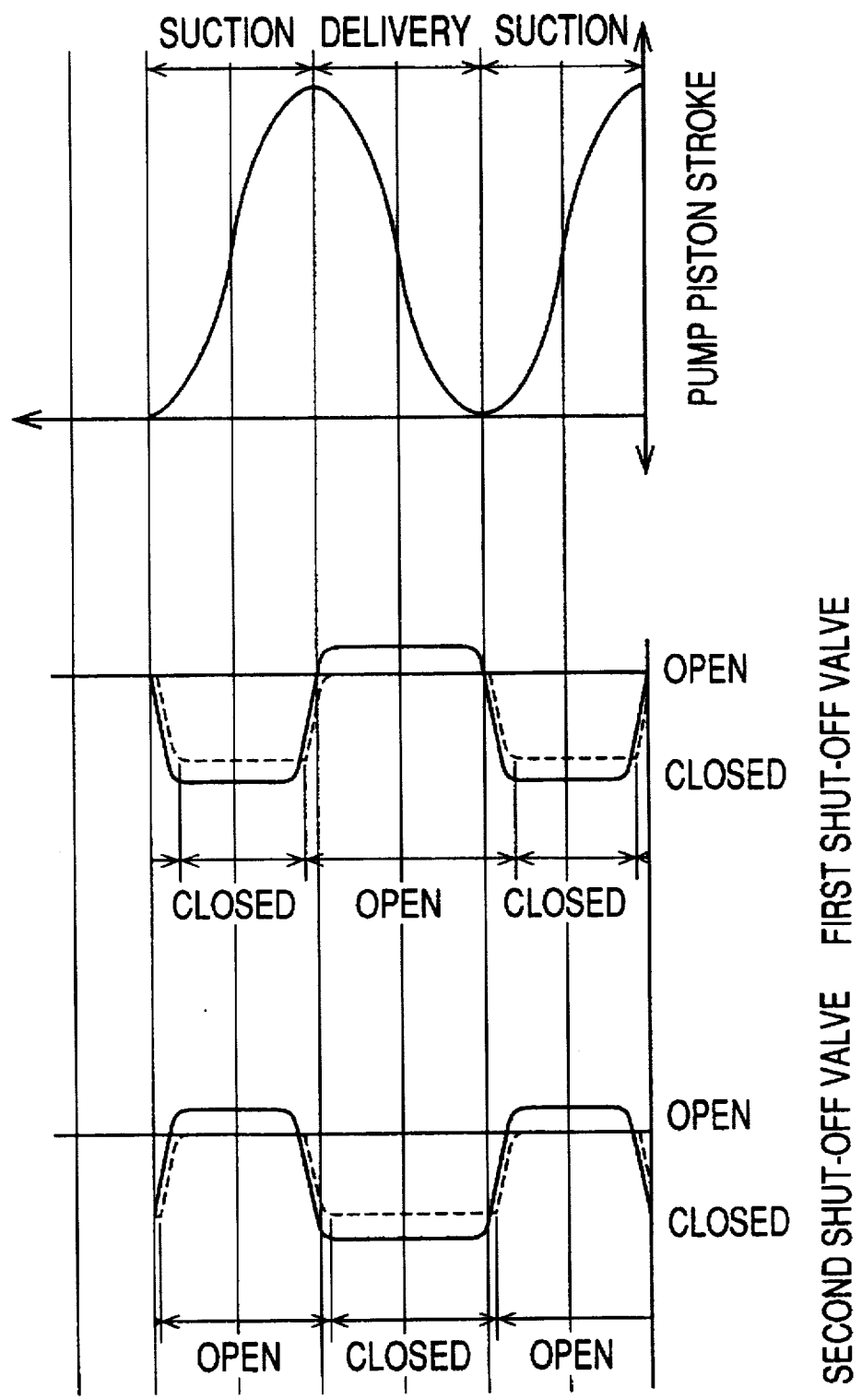
FIG. 17 is a timing chart showing the suction and delivery strokes of a reciprocating pump device and the opening and closing periods of first and second shut-off valves during pressure reduction in the braking pressure control device of FIG. 12.
Figure 18:
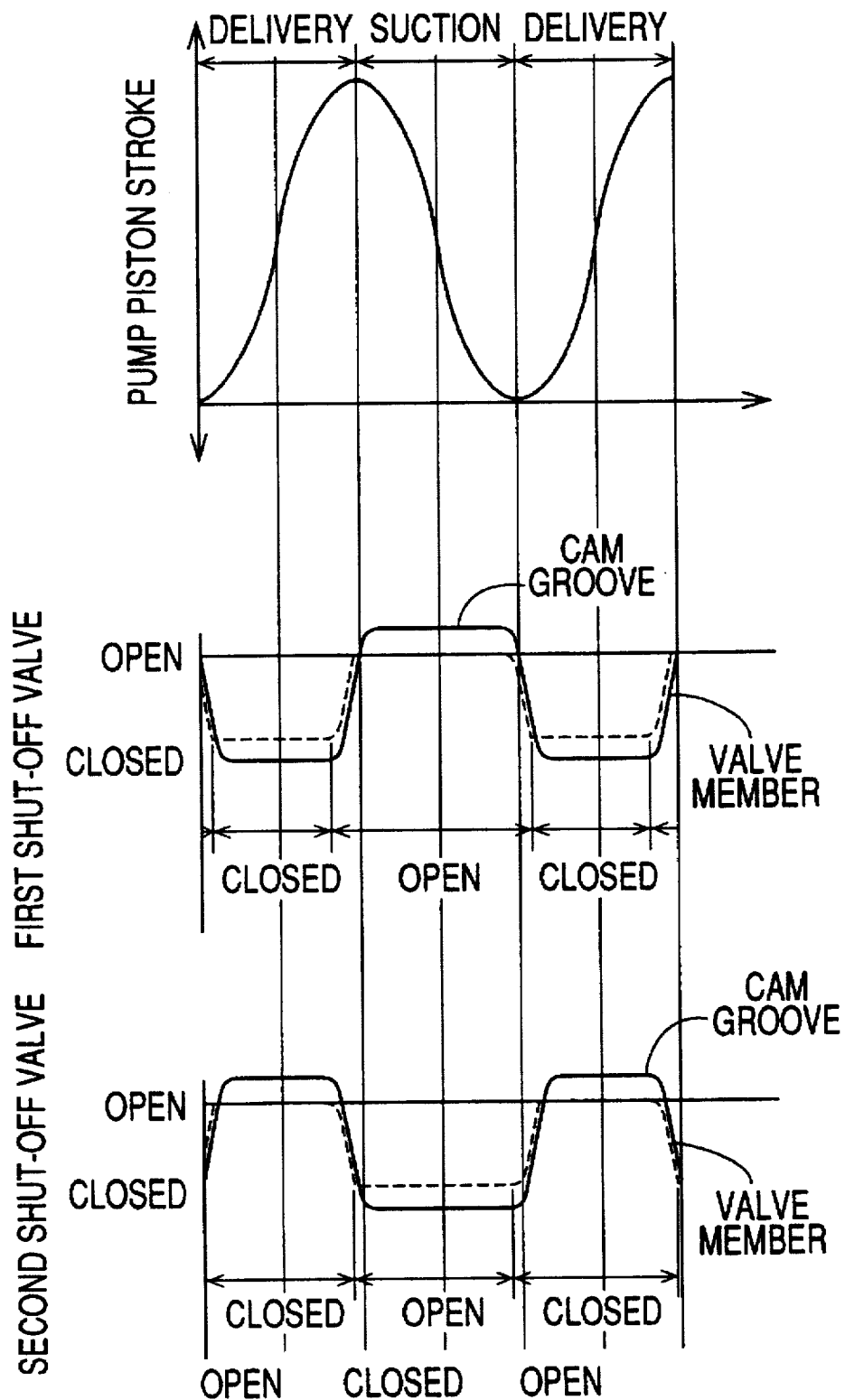
FIG. 18 is a timing chart showing the suction and delivery strokes of the pump device and the opening and closing periods of the first and second shut-off valves during pressure increase in the braking pressure control device of FIG. 12.

As shown in FIG. 15, the cam groove 268 is formed in the corresponding end face of the eccentric cam 266 such that the larger-radius circular arc portion 268b is located at a circumferential portion of the eccentric cam 226 at which the distance from the axis of the rotary shaft 267 is the smallest. The first operating piston 272 engages the cam groove 268 at a circumferential position of the eccentric cam 266 which is spaced by 90° from the circumferential position at which the control piston 74 of the pump device 262 is held in contact with the eccentric cam 266. Accordingly, the first shut-off valve 226 is opened and closed in timed relationship with the suction and delivery strokes of the reciprocating pump 262, as indicated in FIGS. 17 and 18. Basically, the first shut-off valve 226 is closed and opened during the suction and delivery strokes of the pump device 262, respectively, when the eccentric cam 266 is rotated in one of the clockwise and counterclockwise directions, and during the delivery and suction strokes, respectively, when the eccentric cam 266 is rotated in the other direction. In FIGS. 17 and 18, solid lines indicate a movement of the operating piston 272, while broken lines indicate a movement of the valve member 246 of the control piston 236.

However, the smaller-radius circular arc portion 268a of the cam groove 268 is formed such that the first shut-off valve 226 is opened for short times at the beginning and the end of each delivery stroke of the pump device 262, as well as during the suction stroke, as indicated in FIG. 18, when the wheel brake cylinder pressure is increased. Thus, the total opening time of the first shut-off valve 226 is longer than the total closing time.

Like the cam groove 268, the cam groove 270 with which the engaging projection 282 of the second operating piston 274 engages has two circular radius portions 270a, 270b which have an arc center on the axis of the rotary shaft 267 and different radii. The cam groove 270 also has two curved portions 270c, 270d which connect the two circular arc portions 270a, 270b. The cam groove 270 is formed in the corresponding end face of the eccentric cam 266 at the see circumferential portion as the cam groove 268. The second piston 274 engages the cam groove 270 at a circumferential position of the eccentric cam 266 which is 180° spaced apart from the circumferential position at which the first piston 272 engages the cam groove 268.

The cam groove 270 is formed so that the total opening time and the total closing time of each of the second shut-off valves 228, 230 are equal to each other. However, a movement of the control piston 236 of each second shut-off valve 228, 230 is initiated upon initiation of a movement of the second operating piston 274, and is terminated a short time before the termination of the movement of the second operating piston 274. Accordingly, the opening and closing actions of the second shut-off valves 228, 230 are slightly out of synchronization of the suction and delivery stokes of the reciprocating pump device 262.

The second piston 274 cooperates with a cylinder housing 278 to define a variable-volume chamber 330 which communicates with the operating pressure chambers 238 of the second shut-off valves 228, 230 through fluid passages 331, 332, respectively. These fluid passages 331, 332 are connected to the fluid passage 220 through respective fluid passages 333, 334. Each of the fluid passages 333, 334 is provided with a controllable check valve 335 and a check valve 336 which are identical with the controllable check valve 292 and the check valve 294.

With the eccentric cam 226 being rotated, the engaging projection 282 of the second operating piston 274 is moved through the cam groove 270, whereby the second operating piston 274 is advanced and retracted to thereby open and close the second shut-off valves 228, 230. To this end, the cross sectional area of the second operating piston 274 is two times that of the control piston 236 of each second shut-off valve 228, 230, while the cross sectional area of the first operating piston 272 is the same as that of the control piston 236 of the first shut-off valve 226.

Although the circumferential position of the cam groove 270 on the eccentric cam 266 is the same as that of the cam groove 268 as shown in FIGS. 15 and 16, the circumferential positions of the eccentric cam 266 at which the first and second operating pistons 272 and 274 engage the respective cam grooves 268, 270 are offset by 180° from each other in the circumferential direction of the cam 266, as indicated above. Consequently, the second shut-off valves 228, 230 are opened and closed while the first shut-off valve 226 is closed and opened, respectively. Further, the relationship between the opening and closing actions of the second shut-off valves 228, 230 with the suction and delivery strokes of the pump device 262 when the eccentric cam 266 is rotated in the clockwise direction is reversed with respect to the relationship when the eccentric cam 266 is rotated in the counterclockwise direction, as indicated in FIGS. 17 and 18. Since the cam groove 268 is formed so that the total opening time of the first shut-off valve 226 is longer than the closing time, the opening time of the first shut-off valve 226 includes a portion during which the second shut-off valves 228, 230 are also open.

In the fluid passages 331, 332, there are provided respective solenoid-operated directional control valves 338, 340. Each of these directional control valves 338, 340 has a first state for bidirectional fluid communication of the operating pressure chamber 238 of the second shut-off valve 227, 230 with the variable-volume chamber 330 of the second operating piston 274, and a second state for unidirectional fluid communication between the operating pressure chamber 238 and the variable-volume chamber 330 through a check valve 343, 344, which permits a flow of the fluid in a direction front the variable-volume chamber 330 toward the operating pressure chamber 238 and inhibits a flow of the fluid in the opposite direction.

The solenoid-operated directional control valves 338, 348 and the pump drive motor 86 are controlled by an electronic control unit 346 which is principally constituted by a computer. Like the electronic control unit 110 provided in the first embodiment, the electronic control unit 346 obtains slipping tendencies of the individual wheel brake cylinders by calculation on the basis of output signals of the wheel speed sensors 100, 106, etc., and controls the solenoid-operated directional control valves 338, 340 and pump drive motor 86 so as to control the wheel brake cylinder pressures in the anti-lock or traction control mode.

An operation of the braking apparatus of the present third embodiment of the invention will be described.

When the brake pedal 10 is not depressed, the control piston 246 of each of the shut-off valves 226, 228, 230 is held in abutting contact with the stop surface 252 under the biasing action of the spring 248, and the shut-off valves 226, 228, 230 are held open. When the brake pedal 10 is depressed in this condition to brake the front left and rear right wheels 20, 26, the fluid pressurized by the master cylinder 12 is supplied to the wheel brake cylinders 22, 28, whereby the wheels 20, 26 are braked.

The electronic control unit 346 initiates an anti-lock control operation when the slip amount of the wheel 20, 26 exceeds an upper limit of an optimum range, due to an excessively large depression force acting on the brake pedal 10, with respect to the friction coefficient of the road surface on which the vehicle is running. The anti-lock control operation is initiated with forward rotation of the pump drive motor 86 as indicated by solid line arrow in FIG. 12. As a result, the brake fluid is delivered from the small pump 322 to the controllable check valves 292, 335, so that these check valves are placed in their operating state for performing their fluid flow inhibiting function. Then, the first shut-off valve 226 is closed and the second shut-off valve 228, 230 is opened while the pump device 262 is in the suction stroke, as indicated in FIG. 17. Consequently, the fluid is sucked from the wheel brake cylinder 22, 28 into the pump device 262. During the delivery stroke of the pump device 262, the first shut-off valve 226 is opened while the second shut-off valve 228, 230 is closed, as also indicated in FIG. 17, so that the fluid is delivered from the pump device 262 to the master cylinder 12. Thus, the wheel brake cylinder pressure is reduced. As in the preceding embodiments, the wheel brake cylinder pressure is rapidly reduced upon initiation of the anti-lock control operation.

When the slipping tendency of the wheel 20, 26 is eliminated, the wheel brake cylinder pressure is increased.

In this case, the pump drive motor 86 is rotated in the reverse direction as indicated by broken line arrow in FIG. 12. As a result, the first shut-off valve 226 is opened and the second shut-off valve 228, 230 is opened while the pump device 262 is in the suction stroke, as indicated in FIG. 18, whereby the fluid is sucked from the master cylinder 12 into the pump device 262. During the delivery stroke of the pump device 262, the first shut-off valve 226 is closed and the second shut-off valve 228, 230 is opened, as also indicated in FIG. 18, whereby the fluid is delivered to the wheel brake cylinder 22, 28.

The cam groove 288 is formed so that the first shut-off valve 226 is opened for short times at the initial and terminal portions of the opening period of the second shut-off valve 228, 230, as indicated in FIG. 18, when the wheel brake cylinder pressure is increased. In this arrangement, the brake fluid is discharged from the wheel brake cylinder 22, 28 to the master cylinder 12 and the wheel cylinder pressure is reduced, when the master cylinder pressure is lowered below the wheel brake cylinder pressure as a result of a movement of the brake pedal 10 toward its non-operated position while the wheel brake cylinder pressure is being increased. Even when the wheel brake cylinder 22 is not in communication with the master cylinder 12, the wheel brake cylinder pressure is reduced with a discharge flow of the fluid from the wheel brake cylinder 22, 28 to the master cylinder 12 when the wheel brake cylinder pressure becomes higher than the master cylinder pressure by more than the predetermined relief pressure of the pressure relief valve 256.

To hold the wheel brake cylinder pressure, the solenoid-operated directional control valves 338, 340 are switched to their second state for unidirectional fluid communication between the operating pressure chamber 238 and the variable-volume chamber 330 through the check valve 343, 344, irrespective of the rotating direction of the pump drive motor 86. In this state, an advancing movement of the second operating piston 274 causes the brake fluid to be supplied from the variable-volume chamber 330 to the operating pressure chamber 238 of the second shut-off valve 228, 230, so that the second shut-off valve 228, 230 is closed. Since the brake fluid is not discharged from the operating pressure chamber 238, the second shut-off valve 228, 230 is held closed. In the meantime, the fluid is supplied to the variable-volume chamber 330 through the check valve 330, and the fluid is discharged from the variable-volume chamber 330 through the controllable check valve 335, so that the second operating piston 274 is permitted to be reciprocated.

If the brake pedal 10 is moved toward the non-operated position while the wheel brake cylinder pressure is held, the brake fluid is discharged from the wheel brake cylinder 22, 28 to the master cylinder 12 and the wheel brake cylinder pressure is reduced, when the wheel brake cylinder pressure becomes higher than the master cylinder pressure by more than the relief pressure of the pressure relief valve 256.

The pressures in the front and rear wheel brake cylinders in the same braking system are controlled by suitable combinations of the pressure increase, decrease and hold, as indicated in FIG. 7, as in the first embodiment of FIGS. 1–7.

When the brake pedal 10 is released during the anti-lock control operation, the pump drive motor 86 is turned off, and the eccentric cam 266 is stopped at a given angular position unknown. In this condition, one of the first and second shut-off valves 226, and 228, 230 is closed while the other shut-off valve is open. Since the delivery of the fluid from the small pump 322 is stopped when the drive pump motor 86 is turned off, the brake fluid is discharged from the operating pressure chambers 304 of the controllable check valves 292, 335 into the reservoir 14 through the flow restrictor 325, so that the control piston 302 is retracted, and the controllable check valves 292, 335 are placed in their non-operating state in which the check valves 292, 334 are disabled to perform their fluid flow inhibiting function. Consequently, the brake fluid is permitted to be discharged from the operating pressure chambers 238 of the first and second shut-off valves 226, 228, 230, and the control piston 236 is moved to the fully retracted position, whereby the first and second shut-off valves 226, 228, 230 are all returned to the initial open state in which the pressure if generated by the master cylinder 12 is applied to the wheel brake cylinders 22, 28.

If the anti-lock control operation is initiated by operation of the brake pedal 10 when the first shut-off valve 226 is open while the first operating piston 272 is placed at its fully advanced position (for holding the first shut-off valve 226 in the closed state), for example, the rotation of the eccentric cam 266 by the pump drive motor 86 will cause the first operating piston 272 to be retracted, resulting in a flow of the fluid into the fluid passage 288 through the check valve 294, whereby the first operating piston 272 is permitted to be retracted. When the first operating piston 272 is then advanced, the control piston 236 is also advanced, and the first shut-off valve 228 is closed.

When the traction control operation is performed, the pump drive motor 86 is initially turned on. To prevent braking of the rear right wheel 26 which is a non-drive or idler wheel, the solenoid-operated directional control valve 340 is placed in the second state for unidirectional fluid communication between the operating pressure chamber 238 of the second shut-off valve 230 and the variable-volume chamber 330 through the check valve 344, so that the second shut-off valve 230 is closed.

The controllable check valves 292, 335 are placed in their operating state during several turns of the eccentric cam 266. In the traction control operation, the eccentric cam 266 is first rotated in the direction indicated by the broken line arrow in FIG. 12, to supply the pressurized fluid to the brake cylinder 22 of the front wheel 20. As a result, the brake fluid sucked from the master cylinder 12 by the pump device 262 is delivered from the pump device 252 to the wheel brake cylinder 22. The pressure in the wheel brake cylinder 22 to be controlled in the traction control operation is determined by the relief pressure of the pressure relief valve 256. This wheel brake cylinder pressure is sufficient to eliminate excessive slipping of the front drive wheel 20. When it becomes necessary to reduce the wheel brake cylinder pressure as a result of elimination of the excessive slipping tendency of the front drive wheel 20, the eccentric cam 266 is rotated in the direction indicated by the solid line arrow in FIG. 12. When it becomes necessary to hold the wheel brake cylinder pressure, the solenoid-operated directional control valve 338 is switched to the second state for unidirectional fluid communication between the operating pressure chamber 238 of the second shut-off valve 228 and the variable-volume chamber 330 through the check valve 342.

It will be understood from the foregoing explanation of the third embodiment that the first and second operating pistons 272, 274, fluid passages 288, 331, 332, variable-volume chambers 286, 330 and operating pressure chambers 238 constitute a motion transmitting device of hydraulic pressure type for transmitting a motion of a movable member in the form of the eccentric cam 266 of the pump piston drive device 88 to a movable member of the form of the control pistons 236 of the first and second shut-off valves 226, 228, 230.

Figure 19:
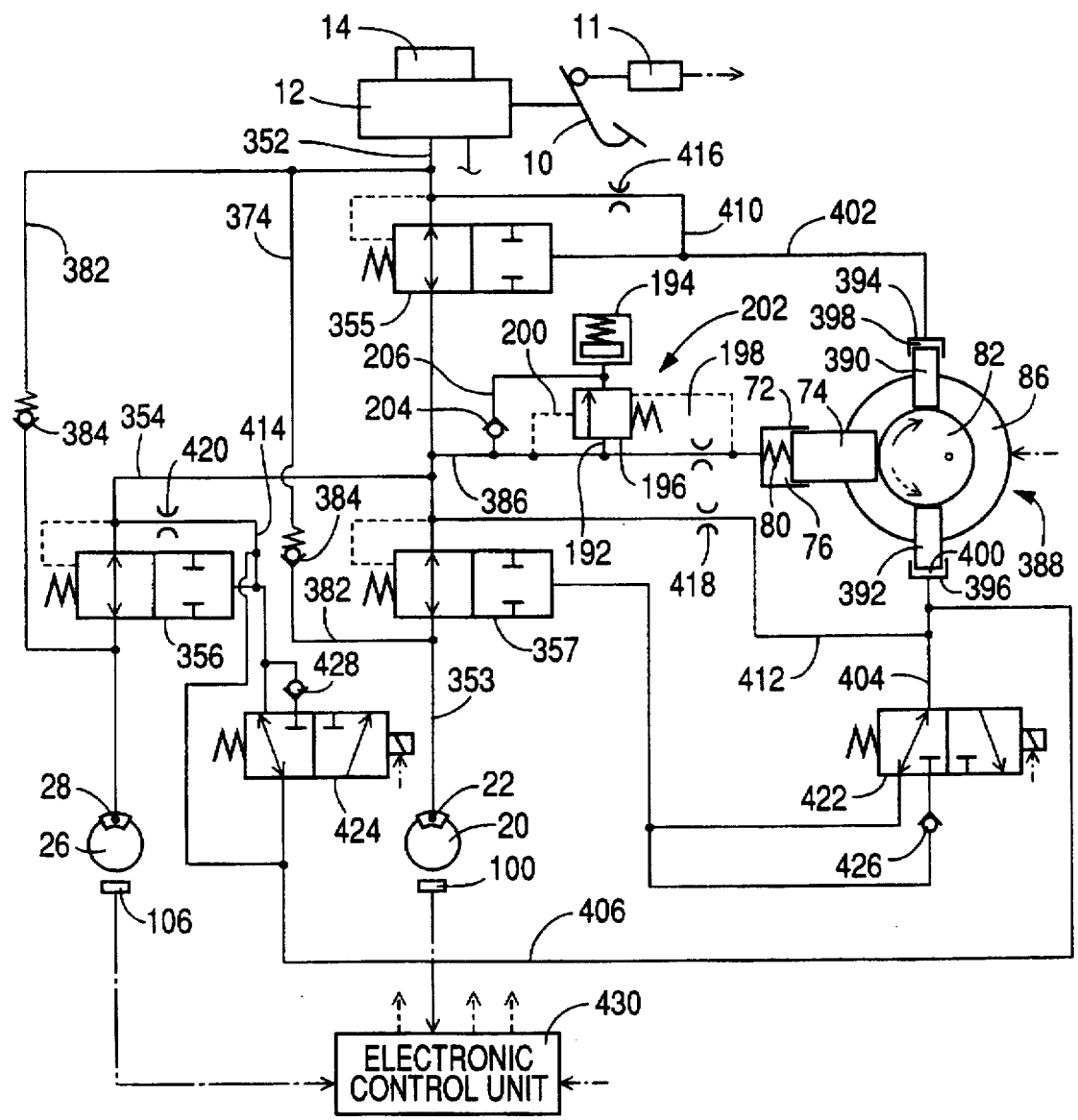
FIG. 19 is a schematic view illustrating a hydraulically operated braking apparatus equipped with a still further embodiment of the hydraulic braking pressure control device of this invention.
Figure 20:
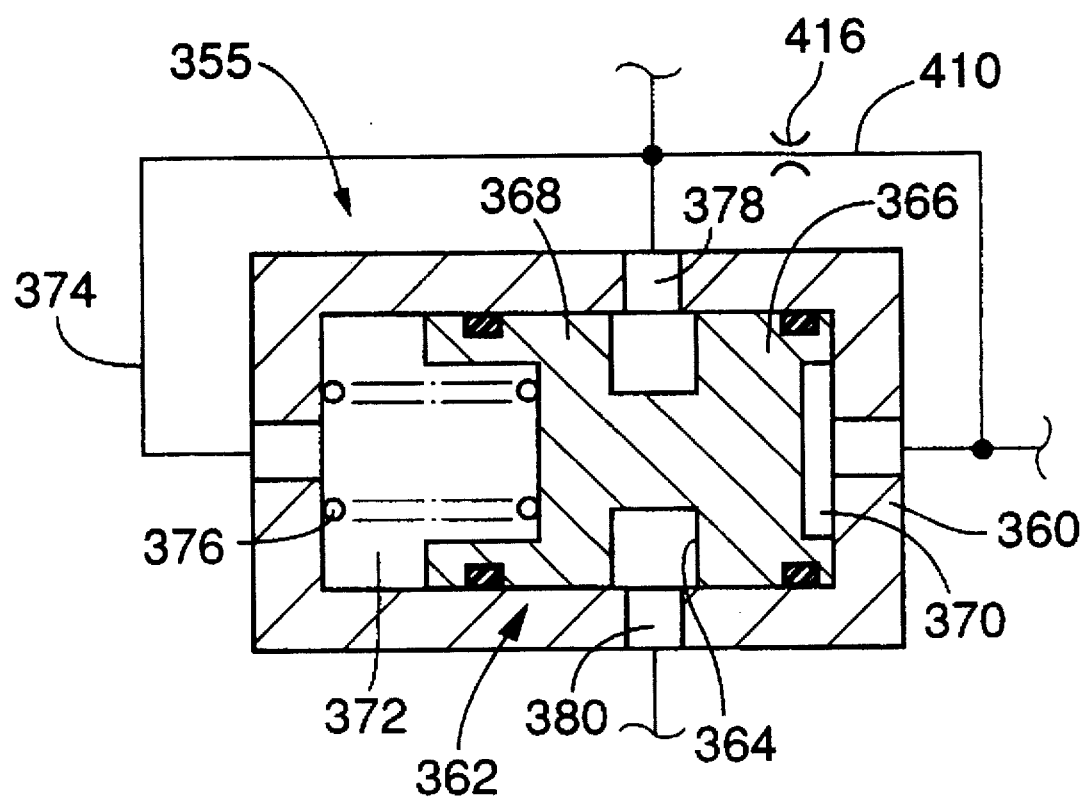
FIG. 20 is a front elevational view in cross section of a first shut-off valve which is an element of the braking pressure control device of FIG. 18.

Referring next to FIGS. 19 and 20, there will be described a fourth embodiment of the present invention wherein first and second shut-off valves are spool valves. In this embodiment, too, the first and second braking systems of the braking apparatus have the same construction. Therefore, only the first braking system including the front left wheel brake cylinder 22 and the rear right wheel brake cylinder 28 is shown in FIG. 19 and will be described by way of example.

As shown in FIG. 19, one of the two pressurizing chambers of the master cylinder 12 is connected to the brake cylinder 22 of the front left wheel 20 through fluid passages 352, 353, and to the brake cylinder 28 of the rear right wheel 26 through fluid passages 352, 354. A first shut-off valve 355 is provided in the fluid passage 352, and two second shut-off valves 357, 356 are provided in the fluid passages 353, 354, respectively. Since all of these three shut-off valves 255, 356, 357 have the same construction, only the first shut-off valve 355 will be described by reference to FIG. 20 by way of example.

The first shut-off valve 355 has a valve housing 360 in which a spool 362 is fluid-tightly and slidably received. The spool 362 has an annular groove 362 formed in an axially intermediate portion thereof, and a first land 366 and a second land 368 which are formed on the opposite sides of the annular groove 364. The spool 362 is fitted in the valve housing 360 such that the first and second lands 366, 368 slidably contact the inner circumferential surface of the valve housing 360.

One of the opposite end faces of the spool 362 cooperates with the valve housing 360 to define an operating pressure chamber 370, while the other end face of the spool 362 cooperates with the valve housing 360 to define a master cylinder pressure chamber 372 which communicates with the corresponding pressurizing chamber of the master cylinder 12 through a fluid passage 374. In the master cylinder pressure chamber 372, there is disposed an elastic member in the form of a spring 376, which serves as biasing means for biasing the spool 362 in a direction for abutting contact of the first land 366 with the bottom surface of the operating pressure chamber 370.

The valve housing 360 has a port 378 communicating with the master cylinder 12, and a port 380 communicating with the ports 378 of the second shut-off valves 356, 357. When the spool 362 biased by the spring 376 is placed in a first position of FIG. 20 in which the first land 366 is in abutting contact with the bottom surface of the operating pressure chamber 370, the two ports 378, 380 communicate with each other through the annular groove 364.

As shown in FIG. 20, the wheel brake cylinders 22, 28 are connected to the master cylinder 12 through respective by-pass passages 382, 382 which by-pass the first and second shut-off valves 355, 356, 357. In each of these by-pass passages 382, there is provided a pressure relief valve 384 whose relief pressure is about 7.8 MPa (80 kg·f/cm²).

A reciprocating pump device 388 is connected to a portion of the fluid passage 352 between the first shut-off valve 355 and the second shut-off valves 356, 357. The pump device 388 has the same construction as the pump device 170. First and second operating pistons 390, 392 are held in contact with the outer circumferential cam surface of the eccentric cam 82 such that the points of contact of the pistons 390, 392 with the eccentric cam 82 are spaced 90° from the point of contact of the pump piston 74 with the eccentric cam 82, in the opposite circumferential directions of the eccentric cam 82. These first and second operating pistons 390, 392 are fluid-tightly and slidably supported by cylinder housings 394, 396, respectively, such that the pistons 390, 392 cooperate with the cylinder housings 394, 396 to define variable-volume chambers 398, 400. The variable-volume chamber 398 is connected to the operating pressure chamber 370 of the first shut-off valve 355 through a fluid passage 402, while the variable-volume chamber 400 is connected to the operating pressure chambers 370 of the second shut-off valves 357, 356 through respective fluid passages 404, 406.

The fluid passages 402, 404, 406 are connected to the master cylinder 12 by respective fluid passages 410, 412, 414 in which are flow restrictors 416, 418, 420 are provided, respectively. When the operating pistons 390, 392 are slowly advanced, a relatively large portion (about ⅔) of the brake fluid delivered from the variable-volume chambers 398, 400 is supplied to the operating pressure chambers 370 of the shut-off valves 355, 356, 357, and a relatively small portion (about ⅓) of the delivered brake fluid is returned to the master cylinder 12 through the flow restrictors 416, 418, 420.

The solenoid-operated directional control valves 422, 424 and the pump drive motor 86 are controlled by an electronic control unit 430, to perform the anti-lock and traction control operations.

An operation of the first braking system of the present braking apparatus will be described.

When the brake pedal 10 is placed in its non-operated position, the spool 362 of each shut-off valve 355, 356, 257 is held at its fully retracted position under the biasing action of the spring 376, with the first land 366 in abutting contact with the bottom surface of the operating pressure chamber 370. In this position, the ports 378, 380 communicate with each other through the annular groove 364, so that the master cylinder 12 communicates with the wheel brake cylinders 22, 28.

When the brake pedal 10 is depressed to brake the front left and rear right wheels 20, 26, the pressure generated in the corresponding pressurizing chamber of the master cylinder 12 is applied to the wheel brake cylinders 22, 28 through the first and second shut-off valves 355–357, whereby the wheels 20, 26 are braked. At this time, the master cylinder pressure is applied to the master cylinder pressure chamber 372 and operating pressure chamber 370 of each shut-off valve 355–357. However, since the pressures in these two chambers 372, 370 are equal to each other, the spool 362 is held in its fully retracted position of FIG. 20 by the spring 376, and the shut-off valves 355–357 are held open.

If the depression force acting on the brake pedal 10 is excessive with respect to the friction coefficient of the road surface and the slip of the wheel 20, 26 exceeds an upper limit of an optimum range, the anti-lock control operation is initiated with the pump drive motor 86 rotated in the direction indicated by the solid line arrow in FIG. 19. As a result, the reciprocating pump device 388 performs alternate suction and delivery strokes of the brake fluid while the first and second operating pistons 390, 392 are alternately advanced and retracted to alternately open and close the first and second shut-off valves 355–357.

When the first operating piston 390 is advanced, the brake fluid is supplied to the operating pressure chamber 370 of the first shut-off valve 355, so that the spool 363 is advanced whereby the ports 378, 380 are disconnected from each other by the first land 366. The spool 362 is further advanced after the disconnection of the ports 378, 380. When the first operating piston 390 is retracted, the brake fluid is discharged from the operating pressure chamber 370 into the variable-volume chamber 398, so that the spool 362 is retracted, and the ports 378, 380 are brought into communication with each other, whereby the first shut-off valve 355 is opened.

Figure 11:
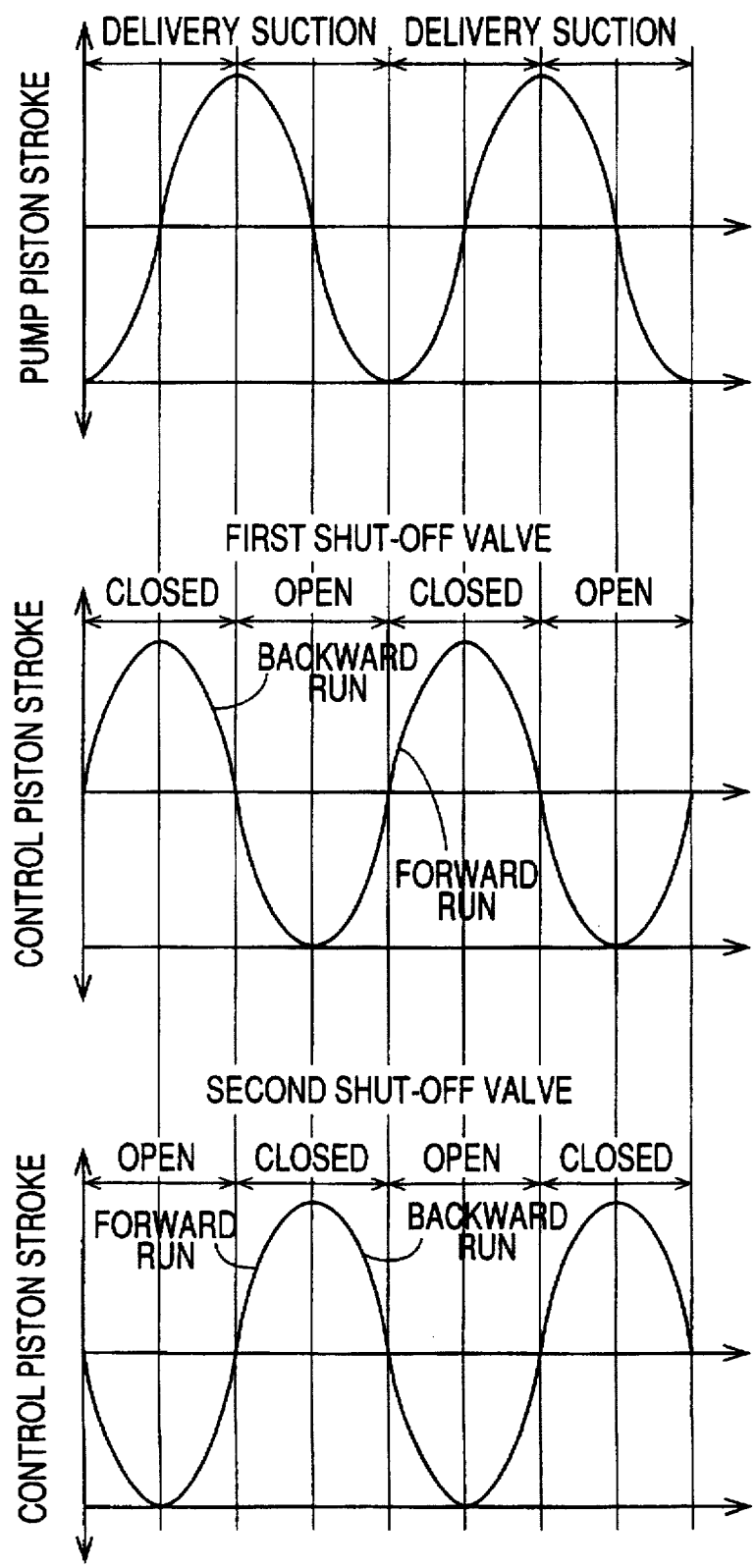
FIG. 11 is a timing chart showing the suction and delivery strokes of the reciprocating pump device and the opening and closing periods of the first and second shut-off valves in a traction control mode in the braking pressure control device of FIG. 8.

As the eccentric cam 82 is rotated in the direction of the solid line arrow of FIG. 19, the first and second shut-off valves 355–357 are opened and closed in timed or synchronized relationship with the suction and delivery of the pump device 388, as indicated in FIG. 10, so that the pressure in the wheel brake cylinder 22, 28 is reduced. When the excessive slip of the wheel 20, 26 is eliminated, the wheel cylinder pressure is increased by reversing the direction of rotation of the eccentric cam 82. In this case, the first and second shut-off valves 355–357 are opened and closed in timed relationship with the suction and delivery of the pump device 388, as indicated in FIG. 11, so that the pressurized fluid is supplied to the wheel brake cylinder 22, 28 to increase the wheel brake cylinder pressure.

When it becomes necessary to hold the wheel brake cylinder pressure, the solenoid-operated directional control valve 422, 424 is switched to the second state for unidirectional fluid communication between the operating pressure chamber 370 and the variable-volume chamber 400 through the check valve 426, 428. In this state, the brake fluid supplied to the operating pressure chamber 370 of the second shut-off valve 356, 357 is not discharged, and the second shut-off valve 356, 357 is held closed.

If the brake pedal 10 is moved toward its non-operated position while the wheel brake cylinder pressure is being increased or held, the pressure relief valve 384 is opened when the wheel brake cylinder pressure becomes higher than the master cylinder pressure by more than the predetermined relief pressure of the valve 384, whereby the brake fluid is returned from the wheel brake cylinder 22, 28 to the master cylinder 12, and the wheel brake cylinder pressure is reduced.

When the anti-lock control operation is terminated, the rotation of the eccentric cam 82 is stopped, and the solenoid-operated directional control valves 422, 424 are restored to their original position of FIG. 19. Although the angular position of the eccentric cam 82 at which the eccentric cam 82 is stopped is not fixed and unknown, the brake fluid is returned from the operating pressure chambers 370 to the master cylinder 12 through the fluid passages 410, 412, 414 and the flow restrictors 416, 418, 420, since the brake fluid is no longer delivered from the variable-volume chambers 398, 400. Consequently, the first and second shut-off valves 355–357 are opened.

If the anti-lock control operation is again performed with the brake pedal 10 depressed, the pump drive motor 86 is turned on irrespective of the positions of the first and second operating pistons 390, 932 at which these pistons were stopped at the end of the previous anti-lock control operation. The spools 362 of the shut-off valves 355, 356, 357 are eventually moved following the movements of the first and second operating pistons 390, 392, so that the shut-off valves 355–357 are opened and closed in timed or synchronized relationship with the suction and delivery strokes of the pump device 388.

The traction control operation is also initiated with the activation of the pump drive motor 86 so as to rotate the eccentric cam 82 in the direction indicated by the broken line arrow in FIG. 19, so that the brake fluid is supplied to the front left drive wheel 20. Since the rear right wheel is not a drive wheel, a supply flow of the brake fluid to the rear right wheel brake cylinder 28 is prevented by switching the solenoid-operated directional control valve 424 to its position for inhibiting the discharge flow of the brake fluid from the operating pressure chamber 370 of the second shut-off valve 356. As a result, the second shut-off valve 356 is closed when the second operating piston 392 is moved to its fully advanced position. Thus, the supply flow of the brake fluid to the rear right wheel brake cylinder 28 to brake the rear right wheel 26 is prevented.

when it becomes necessary to reduce the front left wheel brake cylinder 22 as a result of elimination of the excessive slip of the front left wheel 20, the eccentric cam 82 is rotated in the direction indicated by the solid-line arrow in FIG. 19. If it becomes necessary to hold the pressure in the brake cylinder 22, the directional control valve 422 is switched to the second state for unidirectional fluid communication between the operating pressure chamber 370 and the variable-volume chamber 400 through the check valve 426.

It will be understood from the above explanation of the fourth embodiment of this invention that the first and second pistons 390, 393, operating pressure chamber 370, fluid passages 402–406, and variable-volume chambers 398, 400 constitute a motion transmitting device of hydraulic pressure type for transmitting a motion of a movable member in the form of the eccentric cam 82 of the pump device 88 to a movable member in the form of the spool 362 of the first and second shut-off valves 355–357.

While the several presently preferred embodiments of this invention have been described in detail by reference to the accompanying drawings, it is to be understood that the invention is not limited to the details of the illustrated embodiments, but may be otherwise embodied.

For instance, the rapidly pressure reducing device 202 used in the embodiments of FIGS. 8–20 may be used in the first embodiment of FIGS. 1–7, in place of the rapidly pressure reducing device 66. Conversely, the rapidly pressure reducing device 66 may be used in the embodiments of FIGS. 8–20, in place of the rapidly pressure reducing device 202.

However, the rapidly pressure reducing device is not essential, and may be eliminated, particularly where the reciprocating pump device has a relatively large capacity and is capable of sucking the brake fluid into the variable-volume chamber at a rate high enough to permit rapid reduction of the wheel brake cylinder pressure.

In the third embodiment of FIGS. 12–18 and the fourth embodiment of FIGS. 19–20, the see drive device as used for driving the pump pistons 74 in the first braking system may be used in the second braking system. Similarly, the same drive device as used for driving the first and second operating pistons 272, 274, 390, 392 in the first braking system may be used in the second braking system.

Although the illustrated embodiments take the form a hydraulic braking pressure control device of a hydraulically operated braking apparatus of diagonal or X-crossing type wherein each of the first and second braking systems includes a front wheel brake cylinder and a rear wheel brake cylinder, the principle of the present invention is equally applicable to a hydraulic braking pressure control device of a hydraulically operated braking apparatus having a front braking system including front right and left wheel brake cylinders and a rear braking system including rear right and left wheel brake cylinders.

It is to be also understood that the present invention may be embodied with suitable combinations of elements used in the different embodiments which have been described for illustrative purpose only.

It is to be further understood that the present invention may be embodied with various other changes, modifications and improvements, which may occur to those skilled in the art, without departing from the spirit and scope of the invention defined in the following claims.

What is claimed is:

1. A hydraulic braking pressure control device wherein a master cylinder and a wheel brake cylinder for braking a vehicle wheel are connected by a fluid passage, said device being comprising:

a first shut-off valve provided in said fluid passage;

a second shut-off valve provided in a portion of said fluid passage between said first shut-off valve and said wheel brake cylinder;

a reciprocating pump device including a housing, a pump piston which is reciprocatingly movable in said housing and which cooperates with said housing to define a variable-volume chamber connected to a portion of said fluid passage between said first and second shut-off valves, and a pump piston drive device for reciprocating said pump piston, said pump drive device including an electric motor as a drive source; and synchronizing means for opening and closing said first and second shut-off valves in timed relationship with suction and delivery strokes of said pump piston for suction and delivery of a brake fluid into and from said variable-volume chamber.

2. A hydraulic braking pressure control device according to claim 1, wherein said first and second shut-off valves are solenoid-operated shut-off valves, and wherein said synchronizing means includes volume change detecting means for detecting directions of change of a volume of said variable-volume chamber, and valve control means for opening and closing said first and second shut-off valves on the basis of an output of said volume change detecting means.

3. A hydraulic braking pressure control device according to claim 2, wherein said first and second shut-off valves, said reciprocating pump device and said synchronizing means are provided in each of two braking systems which have respective wheel brake cylinders for braking respective vehicle wheels, and wherein said reciprocating pump devices of said two braking systems use the same pump piston drive device such that said pump pistons of said reciprocating pump device have opposite operating phases, said volume change detecting means comprising shut-off valve closing means for closing both of said first and second shut-off valves in one of said two braking systems, and change direction determining means for determining said directions of change of the volume of said variable-volume chamber of each of said two braking systems on the basis of a drive current of said electric motor of said pump piston drive device while said first and second shut-off valves of said one braking system are both closed by said shut-off valve closing means.

4. A hydraulic braking pressure control device according to claim 3, wherein said shut-off valve closing means comprises at least one of anti-lock control shut-off valve closing means for closing said first and second shut-off valves of a predetermined one of said two braking systems during said suction stroke of said pump piston of said reciprocating pump device of one of said two braking systems when the hydraulic braking pressure control device is operated in an anti-lock control mode, and traction control shut-off valve closing means for closing said first and second shut-off valves of a predetermined one of said two braking systems during said delivery stroke of said pump piston of said reciprocating pump device of one of said two braking systems when the hydraulic braking pressure control device is operated in a traction control mode, said change direction determining means comprising at least one of anti-lock control change direction determining means and traction control change direction determining means which corresponds to said at least one of anti-lock control shut-off valve closing means and traction control shut-off valve closing means, said anti-lock control change direction determining means determining said direction of change of the volume of said variable-volume chamber of each of said two braking systems depending upon whether said drive current increases above a predetermined threshold state during said delivery stroke of said pump piston immediately after termination of closure of said first and second shut-off valves by said anti-lock control shut-off valve closing means, said traction control change direction determining means determining said direction of change of the volume of said variable-volume chamber depending upon said drive current increases above a predetermined threshold state while said first and second shut-off valves are held closed by said traction control shut-off valve closing means.

5. A hydraulic braking pressure control device according to claim 2, wherein said volume change detecting means comprises means for detecting said directions of change of the volume of said variable-volume chamber on the basis of a drive current of said electric motor of said pump piston drive device.

6. A hydraulic braking pressure control device according to claim 1, further comprising a rapidly pressure reducing device including a reservoir passage connected to said portion of said fluid passage between said first and second shut-off valves, a reservoir connected to said reservoir passage, and a third shut-off valve which is provided in said reservoir passage and which is normally closed and is opened at least when a pressure in said wheel brake cylinder is reduced for the first time.

7. A hydraulic braking pressure control device according to claim 6, wherein said rapidly pressure reducing device includes a first pilot passage communicating with said third shut-off valve and said variable-volume chamber, and a second pilot passage which communicates with said third shut-off valve and which communicates with said first pilot passage through flow restricting means, said third shut-off valve being a pilot-operated shut-off valve which receives a first and a second pilot pressure in said first and second pilot passages, respectively, which first and second pilot pressures act on said pilot-operated shut-off valve in opposite directions, said pilot-operated shut-off valve being opened when said first pilot pressure is lower than said second pilot pressure by more than a predetermined value.

8. A hydraulic braking pressure control device according to claim 7, wherein said flow restricting means includes said first shut-off valve, and said first pilot passage is connected to a portion of said fluid passage between said master cylinder and said first shut-off valve, while said second pilot passage is connected to said portion of said fluid passage between said first and second shut-off valves.

9. A hydraulic braking pressure control device according to claim 7, wherein said variable-volume chamber is connected through a pump passage to said portion of said fluid passage between said first and second shut-off valves, and said flow restricting means includes flow resistance applying means for applying a resistance to a flow of said brake fluid through said pump passage in at least a direction toward said variable-volume chamber, said first and second pilot passages being connected to respective portions of said pump passage which are on opposite sides of said flow resistance applying means and which are respectively connected to said variable-volume chamber and said portion of said fluid passage between said first and second shut-off valves.

10. A hydraulic braking pressure control device according to claim 1, wherein said synchronizing means comprises a motion transmitting device for transmitting a motion of a movable member of said pump piston drive device to a movable member of each of said first and second shut-off valves.

11. A hydraulic braking pressure control device according to claim 10, wherein said motion transmitting device comprises a motion transmitting device of solid member type including solid members which contact each other for transmitting the motion of said movable member of said pump piston drive device to said movable member of said first and second shut-off valves.

12. A hydraulic braking pressure control device according to claim 10, wherein said motion transmitting device comprises a motion transmitting device of hydraulic pressure type which utilizes a hydraulic pressure to transmit the motion of said movable member of said pump piston drive device to said movable member of said first and second shut-off valves.

13. A hydraulic braking pressure control device according to claim 1, wherein said pump piston drive device comprises a cam rotated by said electric motor, and biasing means for biasing said pump piston toward a cam surface of said cam.

14. A hydraulic braking pressure control device according to claim 1, wherein said synchronizing means comprises means for opening both of said first and second shut-off valves for fluid communication between said master cylinder and said wheel brake cylinder, during a portion of a period during which said first and second shut-off valves are closed and opened, respectively, for increasing a pressure of said brake fluid in said wheel brake cylinder.

15. A hydraulic braking pressure control device according to claim 1, wherein said synchronizing means comprises pressure change determining means for determining whether a pressure of said brake fluid in said wheel brake cylinder should be increased or decreased, and means for determining, on the basis of an output of said pressure change determining means, whether each of said first and second shut-off valves should be opened or closed.

* * * * *

UNITED STATES PATENT AND TRADEMARK OFFICE
CERTIFICATE OF CORRECTION

PATENT NO. : 5,711,582  
DATED : January 27, 1998  
INVENTOR(S) : Shin Koike

It is certified that error appears in the above-indentified patent and that said Letters Patent is hereby corrected as shown below:

Title page, item [57]

In the Abstract, line 5: Change "reciprocatingly" to --reciprocating--.

| Column | Line | |
|---|---|---|
| 1 | 24 | Change "vales" to --valves--. |
| 5 | 22 | Change "In the light" to --In light--. |
| 8 | 7 | Change "toe" to --to--. |
| 8 | 12 | Change "see wheel" to --same wheel--. |
| 8 | 40 | After "reservoir," change "to that" to --so that--. |
| 8 | 41 | Change "reduced this" to --reduced. This--. |
| 12 | 7 | Change "see pressure" to --same pressure--. |
| 12 | 42 | Change "that t The" to --that the--. |

UNITED STATES PATENT AND TRADEMARK OFFICE
CERTIFICATE OF CORRECTION

PATENT NO. : 5,711,582
DATED : January 27, 1998
INVENTOR(S) : Shin Koike

It is certified that error appears in the above-indentified patent and that said Letters Patent is hereby corrected as shown below:

| Column | Line | |
|---|---|---|
| 12 | 66 | Change "50" to --60--. |
| 13 | 31 | Change "much" to --such--. |
| 13 | 42 | Change "58" to --68--. |
| 14 | 40 | Change "vales" to --valves--. |
| 15 | 41 | Change "vales" to --valves--. |
| 15 | 46 | Before "anti-lock" delete "an". |
| 15 | 47 | Change "initiated since" to --initiated. Since--. |
| 17 | 2 | Change "considerable" to --considerably--. |
| 17 | 33 | Change "vales" to --valves--. |

UNITED STATES PATENT AND TRADEMARK OFFICE
CERTIFICATE OF CORRECTION

PATENT NO. : 5,711,582
DATED : January 27, 1998
INVENTOR(S) : Shin Koike

It is certified that error appears in the above-indentified patent and that said Letters Patent is hereby corrected as shown below:

| Column | Line | |
|---|---|---|
| 17 | 35 | Change "It" to --If--. |
| 17 | 62 | Change "IN" to --If--. |
| 20 | 15 | Before "FIG. 5C" Insert --in--. |
| 20 | 19 | After "temporarily" insert --close--. |
| 20 | 48 | Delete "pressure" (second occurrence). |
| 21 | 8 | Change "right right wheels" to --right wheels--; change "20, 25" to --20, 26--. |
| 22 | 55 | Change "shut-oil" to --shut-off--. |
| 23 | 17 | Change "re open. consequently" to --re-open. Consequently--. |
| 23 | 32 | Change "chance" to --change--. |

UNITED STATES PATENT AND TRADEMARK OFFICE
CERTIFICATE OF CORRECTION

PATENT NO. : 5,711,582  
DATED : January 27, 1998  
INVENTOR(S) : Shin Koike

Page 4 of 5

It is certified that error appears in the above-indentified patent and that said Letters Patent is hereby corrected as shown below:

| Column | Line | |
|--------|------|---|
| 24 | 6  | Change "stokes" to --strokes--. |
| 24 | 18 | Change "45" to --46--. |
| 24 | 51 | Change "delivery" to --deliver--. |
| 26 | 23 | Change "is delivery" to --is delivered--. |
| 27 | 61 | Change "Fur" to --For--. |
| 28 | 1  | Delete "may" (second occurrence). |
| 29 | 38 | Before "between" delete "of". |
| 30 | 21 | Change "195" to --196--. |
| 30 | 31 | Change "205" to --206--. |
| 31 | 13 | Change "75" to --76--. |
| 31 | 14 | After "delivery" insert --of--. |

UNITED STATES PATENT AND TRADEMARK OFFICE
CERTIFICATE OF CORRECTION

PATENT NO. : 5,711,582
DATED : January 27, 1998
INVENTOR(S) : Shin Koike

It is certified that error appears in the above-indentified patent and that said Letters Patent is hereby corrected as shown below:

| Column | Line | |
|---|---|---|
| 32 | 48 | Change "the the duty" to --the duty--. |
| 36 | 48 | Change "shown in" to --valve 292--. |
| 38 | 3 | Change "258c" to --268c--. |
| 39 | 14 | Change "see" to --same--. |
| 39 | 29 | Change "stokes" to --strokes--. |
| 40 | 16 | Change "front" to --from--. |
| 41 | 12 | Change "288" to --268--. |
| 46 | 49 | Change "see" to --same--. |
| 46 | 55 | After "form" insert --of--. |

Signed and Sealed this

Twentieth Day of October, 1998

Attest:

Attesting Officer

BRUCE LEHMAN

Commissioner of Patents and Trademarks